US012682427B2

(12) United States Patent
Wang et al.

(10) Patent No.:  US 12,682,427 B2
(45) Date of Patent:  Jul. 14, 2026

---

(54) OPTICAL METHOD

(71) Applicant: Living Optics Limited, Oxford (GB)

(72) Inventors: Robin Wang, Oxford (GB); Alexander Spanellis, Oxford (GB); Stephen Chappell, Oxford (GB)

(73) Assignee: Living Optics Limited, Oxford (GB)

( * ) Notice: Subject to any disclaimer, the term of this patent is extended or adjusted under 35 U.S.C. 154(b) by 423 days.

(21) Appl. No.: 18/265,447

(22) PCT Filed: Dec. 10, 2021

(86) PCT No.: PCT/EP2021/085282
§ 371 (c)(1),
(2) Date: Jun. 6, 2023

(87) PCT Pub. No.: WO2022/123047
PCT Pub. Date: Jun. 16, 2022

(65) Prior Publication Data
US 2024/0037709 A1  Feb. 1, 2024

(30) Foreign Application Priority Data

Dec. 11, 2020  (EP) .................................... 20386056

(51) Int. Cl.
*G06T 5/50* (2006.01)
*G06T 3/40* (2006.01)
(Continued)

(52) U.S. Cl.
CPC .................. *G06T 5/50* (2013.01); *G06T 3/40* (2013.01); *G06T 5/30* (2013.01); *G06T 7/30* (2017.01);
(Continued)

(58) Field of Classification Search
CPC ........ G06V 20/194; G06T 2207/10036; G06T 5/50; G06T 2207/10101; G01J 2003/2826;
(Continued)

(56) References Cited

U.S. PATENT DOCUMENTS 11,561,134 B2 * 1/2023 Wang .................. H03M 7/3066
2019/0096049 A1   3/2019 Kim et al.

FOREIGN PATENT DOCUMENTS

WO      2020/127422 A1     6/2020

OTHER PUBLICATIONS

Jianwei Zheng, "Hyperspectral Image Classification Using Mixed Convolutions and Covariance Pooling", Jan. 2021 (Year: 2021).*
(Continued)

*Primary Examiner* — Andrew W Bee
*Assistant Examiner* — Caleb L Esquino
(74) *Attorney, Agent, or Firm* — 24IP Law Group USA, PLLC; Timothy R DeWitt

(57) ABSTRACT

A method of reconstructing a hyperspectral data cube from an encoded and/or spectrally sheared image and an unencoded and spectrally unsheared image of a scene comprises providing the encoded and/or spectrally sheared image and an unencoded and spectrally unsheared image to a neural network comprising an encoder-decoder structure having an encoder portion and a decoder portion; performing one or more primary convolution operations using the encoder portion; and performing one or more transpose convolution operations using the decoder portion; performing spatially adaptive normalization and/or inverted attention normalization on an output of primary convolution operations and/or transpose convolution operations wherein the spatially adaptive normalization and/or inverted attention normalization is performed using a representation of an encoding scheme
(Continued)

used to encode the at least one encoded and/or spectrally sheared image and an unencoded and spectrally unsheared image of the scene.

24 Claims, 19 Drawing Sheets

(51) Int. Cl.
| | | |
|---|---|---|
| *G06T 5/30* | (2006.01) | |
| *G06T 7/30* | (2017.01) | |
| *G06V 20/10* | (2022.01) | |

(52) U.S. Cl.
CPC .. *G06V 20/194* (2022.01); *G06T 2207/10036* (2013.01); *G06T 2207/20004* (2013.01); *G06T 2207/20084* (2013.01); *G06T 2207/20212* (2013.01)

(58) Field of Classification Search
CPC ............... G01J 3/2823; G01B 9/02044; G02B 27/1013; G02B 21/0064

See application file for complete search history.

(56) References Cited

OTHER PUBLICATIONS

Taesung Park, Semantic Image Synthesis with Spatially-Adaptive Normalization:, Nov. 2019 (Year: 2019).*
Inchang Choi, "High-Quality Hyperspectral Reconstruction Using a Spectral Prior", Nov. 2017 (Year: 2017).*
Zhenming Yu, "Deep learning enabled reflective coded aperture snapshot spectral imaging", Dec. 2022 (Year: 2022).*
Ruixuan Zhao, "Coded aperture snapshot spectral imaging fundus camera", May 2023 (Year: 2023).*
Bostick Randall L et al: Hyperspectral image reconstruction of an array of extended targets using chromotomosynthesis, Optical Engerineering, Oct. 1, 2012; XP060025290.
Choi Inchang et al: "High quality hyperspectral reconstruction using a spectral prior", ACM Transactions on Graphics, ACM, NY, US, vol. 36, No. 6, Nov. 20, 2017 (Nov. 20, 2017), pp. 1-13.
Miao, Xin, et al. entitled "Iambda-Net: Reconstruct Hyperspectral Images From a Snapshot Measurement." 2019 IEEE/CVF International Conference on Computer Vision (ICCV). IEEE, 2019.
Zhang, Han, et al. "Self-attention generative adversarial networks." International Conference on Machine Learning. PMLR, 2019.
Isola, Phillip, et al. "Image-to-image translation with conditional adversarial networks." Proceedings of the IEEE conference on computer vision and pattern recognition. 2017.

* cited by examiner

OPTICAL METHOD

TECHNICAL FIELD

The present disclosure relates to a method of hyperspectral image acquisition.

BACKGROUND

Hyperspectral imaging involves the acquisition of a three dimensional datacube of a scene, collecting intensity through one spectral and two spatial domains. The datacube is in the format I(x, y, λ). Each slice of the data cube comprises an xy image corresponding with a particular wavelength of light. Conventional hyperspectral imagers rely on two main capture methods: capture of a datacube using a scanning 2D sensor, or spatially multiplexing spectral information to be retrieved after post processing. Scanning imagers are limited in orientation and must scan (hence the name), which is a process that takes considerable time and introduces motion artefacts. Multiplexing imagers largely avoid errors introduced by scanning, but require significant sacrifice of spatial information or complex sensors to achieve hyperspectral imaging. Multiplexing imagers are limited in resolution and or are difficult to manufacture.

In order to achieve a single-shot hyperspectral capture and to circumvent the resolution sacrifice of multiplexing spectrometers, algorithmic imaging approaches have been trialled. The most notable examples have been the Coded Aperture Snapshot Spectral Imager (CASSI) and its variants. CASSI relies on compressed sensing—a signal processing framework for reconstructing underdetermined linear systems. By manipulating an incoming signal into a format viable for a compressed sensing reconstruction, CASSI can reconstruct a hyperspectral datacube from a signal obtained from a single exposure of a conventional two-dimensional detector. However, whilst CASSI achieves single shot imaging without significant sacrifice of spatial resolution nor complex multiplexing, it can only capture datacubes at resolution limited by reconstruction times with occasional artefacts, as a normal compressed sensing reconstruction at 256*256*25 is already too long for practical use. Some attempts were made to use machine learning for image reconstruction, in particular using generative adversarial networks (GAN).

For example, in the article of Miao, Xin, et al. entitled "lambda-Net: Reconstruct Hyperspectral Images From a Snapshot Measurement." 2019 IEEE/CVF International Conference on Computer Vision (ICCV). IEEE, 2019, a method was described to reconstruct a CASSI hyperspectral signal using a learned generative adversarial net. However; this method is only meant for one Cassi view, and does not include atrous convolutions nor correct for perspective differences.

Also, it has been shown in non-hyperspectral conventional computer vision, in Zhang, Han, et al. "Self-attention generative adversarial networks." *International Conference on Machine Learning.* PMLR, 2019, that incorporating self-attention mechanism into a GAN architecture can allow a model to leverage both local and global spatial information to generate image features. In addition, the paper shows that applying a Lipschitz constraint (in the form of spectral normalisation) in both the generator and discriminator improves model performance and stability.

In addition, Isola, Phillip, et al. "Image-to-image translation with conditional adversarial networks." *Proceedings of the IEEE conference on computer vision and pattern rec-*

*ognition.* 2017, described using conditional gains in combination with a constraining 12 to loss to generate high resolution high fidelity images in a non-hyperspectral computer vision setting.

It is an object of the present disclosure to overcome or at least ameliorate the shortcomings associated with known coded aperture hyperspectral imaging methods.

SUMMARY

According to a first aspect, there is provided a computer-implemented method of correcting for view differences between a spectrally unsheared first image and a spectrally sheared second image. The first image may be unencoded, and the second image may be encoded or unencoded. The method comprises using a machine learning algorithm to determine a transform configured to map the first and second images to one another. The method also comprises correcting for view differences by transforming one of the first image and the second image using the determined transform.

The spectrally sheared or unsheared views representing a view captured of any imaging sensor including but not limited to monochrome, rgb, rgb-i, rgb-ir, or any debayering sensor.

Directly finding the parameters of a transform (e.g., perspective transform) for correcting for view differences between images is particularly challenging where one of the images is spectrally sheared. Traditional parallax correction techniques (e.g., computer vision parallax correction techniques) cannot be applied. Using a machine learning approach to determine a transform (e.g., perspective transform) for correcting for view differences (e.g., parallax or misalignment etc.) between different views (for example, multiple views detected by a hyperspectral imaging system) may enable efficient iterative determination of the transform.

In the context of a hyperspectral imaging system, using a machine learning approach may also provide enhanced alignment robustness. Compressed sensing reconstruction methods require perfect prior knowledge of a location of encoder features on a detector—misalignment between a mask and a sensor can render accurate hyperspectral datacube reconstruction impossible. Using a machine learning approach to determine a transform (e.g., perspective transform), providing mapping to a common view basis for different views to correct for any view differences (e.g., parallax or misalignment etc.), means that prior knowledge of those differences is not required, and view differences are accounted for during the training process to determine the transform. That may enable a hyperspectral datacube to be accurately reconstructed, even in the case where, e.g., an encoder is relayed to a sensor with several pixels of error. The typically expensive and lengthy alignment process required for hyperspectral imagers may not be required in order to accurately reconstruct hyperspectral datacubes. That alignment robustness may also be advantageous for addressing thermal expansion and/or deformation, vibration induced noise and general robustness (e.g., typically hyperspectral imagers cannot be knocked or dropped without destroying alignment).

The view differences may comprise a parallax error, rotation error, alignment error, magnification error etc.

The machine learning algorithm may comprise a neural network.

The method may comprise concatenating the first image and the second image to form concatenated image data. The method may also comprise providing the concatenated image data to the neural network. The method may further comprise performing, using the neural network, one or more convolution operations. The method may comprise determining, using the neural network, the transform from an output of the one or more convolution operations. The method may also comprise transforming the one of the first image and the second image using the determined transform.

Performing, using the neural network, one or more convolutional operations, may further comprise down-sampling.

The method may further comprise reshaping, using the neural network, an output of the one or more convolution operations prior to determining the transform.

Reshaping the output of the one or more convolution operations may comprise reshaping the output from a two-dimensional dataset to a one-dimensional dataset.

The neural network may comprise one or more densely connected layers configured to determine the transform.

The perspective transform may comprise a transformation matrix. The method may comprise determining, using the neural network, one or more parameters of the transformation matrix. The transformation matrix may comprise a transformation matrix defining at least one of a rotation, a translation, a shear and perspective shift and scaling.

The neural network may comprise a plurality of parallel paths for performing the one or more convolution operations. That may provide improved stability and learning of the neural network during backpropagation. One of the parallel paths have a non-linear output, and one of the parallel paths may have a linear output. If backpropagation and learning through one of the paths (e.g., the non-linear path) results in a very high rate of change or no rate of change during learning, then learning may instead propagate through the other parallel path (e.g., the linear path).

The method may comprise transforming the second image to provide a corrected second image.

The present invention proposes a computer implemented method of reconstructing a hyperspectral data cube from at least one encoded and/or spectrally sheared image and an unencoded and spectrally unsheared image of the scene, the method comprising:

providing the at least one encoded and/or spectrally sheared image and an unencoded and spectrally unsheared image to a neural network comprising an encoder-decoder structure having an encoder portion and a decoder portion;

performing one or more primary convolution operations using the encoder portion; and performing one or more transpose convolution operations using the decoder portion;

performing spatially adaptive normalisation and/or inverted attention normalisation on an output of at least one of the one or more primary convolution operations and/or transpose convolution operations using a representation of a encoding scheme used to encode the at least one encoded and/or spectrally sheared image and an unencoded and spectrally unsheared image of the scene or an unencoded and spectrally unsheared image of the scene.

The at least one encoded and spectrally sheared image in which either or both can be either monochrome, a filter based imaging system or have a high level of determinism. The spectrally unsheared image can be either monochrome, a filter based imaging system. The filter based camera system can include Bayer imaging systems.

Reconstructing a hyperspectral datacube from an image corrected for view differences (e.g., misalignment, parallax, hardware faults etc.) may provide improved hyperspectral reconstruction. In the context of tomographic reconstruction of a hyperspectral datacube, reconstructing a hyperspectral datacube from at least one encoded an spectrally sheared image, including correcting for view differences, may enable the unique information in that view to be used independently from other views before making use of all the views in a combined reconstruction, whilst providing a common view basis for the different views.

According to an aspect, there is provided a computer-implemented method of reconstructing a hyperspectral data cube from an encoded and spectrally sheared image. The method comprises providing the image to a neural network. The neural network comprises an encoder-decoder structure having an encoder portion and a decoder portion. The method comprises performing one or more primary convolution operations using the encoder portion. The method comprises performing one or more transpose convolution operations using the decoder portion. The method comprises performing spatially adaptive normalisation and/or applying an Inverted attention normalisation block on an output of at least one of the one or more primary convolution operations and/or transpose convolution operations using a representation of a mask used to encode the image.

Spatially adaptive normalisation applies the mask used to encode the image onto the features extracted by the primary convolution operations. SPADE forces the neural network to utilise the encoding scheme information and may therefore exploit the compression which the encoding scheme provides. The enforcement of the mask is achieved via a scaling (e.g., normalising) and bias approach. SPADE may be uniquely effective in a context where a signal is masked and then dispersed before being detected (as left-shear measurement 601). Normalising and biasing an encoding mask may enable the mask information to be better exploited in the reconstruction of a hyperspectral datacube.

Performing spatially adaptive normalisation (SPADE) may comprise performing a first secondary convolution operation on the representation of the encoding scheme and/or on any sheared or unsheared view. Performing SPADE may also comprise performing a second secondary convolution operation on an output of the first secondary convolution operation. Performing SPADE may also comprise performing element-wise multiplication between an output of the second secondary convolution operation and an output of a primary convolution operation or transpose convolution operation. Performing SPADE may comprise summing an output of the second secondary convolution operation with an output of the element-wise multiplication.

The method may comprise resizing the representation of the mask to match a resolution of the output of the primary convolution operation or transpose convolution operation.

Inverted attention normalisation may comprise a convolution or transpose convolution operation applied on to the input features. Performing inverted attention normalisation may contain one or many spatially adaptive normalisation operations applied to input features. The method may contain one or more convolutional operations successively applied to the results of final spatially adaptive normalisation operations.

The Inverted attention normalisation method may comprise one of a sigmoid operation and/or softmax activation operation applied to the result of the last convolution previously applied. This method may comprise of an element wise multiplication between output of the first convolutional operation and the result of activation operation. Performing Inverted attention normalisation may contain one or more convolution and/or transposed convolution operations successively applied to the result of the element wise multiplication.

The method may comprise performing one or more residual convolution operations using one or both of the encoder portion and the decoder portion. A residual convolution operation may enable the neural network to extract features that are relative to the results of earlier layers in the neural network. That may create non-linearity and complexity in the neural network, and may enable the neural network to identify such characteristics in the data. A residual convolution operation may also aid model learning via back-propagation.

Performing a residual convolution operation may comprise providing an input, performing one or more convolution operations, and combining the input and an output of the series of successive convolution operations.

Combining the input and the output of the one or more convolution operations may comprise summation, concatenation or multiplication or a combination of these operations of the input and the output of the one or more convolution operations.

The input may be or comprise one of an output of a primary convolution operation or a transpose convolution operation, and an output of spatially adaptive normalisation.

The method may comprise providing skip connections between the encoder portion and the decoder portion.

The method may comprise correcting the encoded and spectrally sheared image for view differences using the method of the third aspect.

According to a further aspect, there is provided a computer-implemented method of training the neural network of one or more of the first aspect, the second aspect or the third aspect. The method comprises training the neural network using one or more of:

i) an L2 loss function;

ii) an alignment loss function;

iii) a compressed measurement loss function; and iv) relative normalised loss function.

The method may comprise training the neural network using a weighted sum of at least two different loss functions.

According to an aspect, there is provided a computer-implemented method of reconstructing a hyperspectral datacube. The method comprises obtaining a spectrally unsheared image of a scene. The method also comprises obtaining at least one spectrally sheared image of the scene. The method further comprises reconstructing a hyperspectral datacube corresponding to the scene using the spectrally unsheared image and the at least one spectrally sheared image.

Using both at least one spectrally sheared image of a scene and a spectrally unsheared image of the scene allows for an improved reconstruction of a hyperspectral datacube corresponding to the scene by providing additional information for the reconstruction. The spectrally unsheared image may also provide a simple visual comparison for the reconstructed hyperspectral datacube.

The method may comprise using a neural network to reconstruct the hyperspectral datacube.

The method may comprise determining an estimated hyperspectral datacube of the scene using the at least one spectrally sheared image of the scene. The method may comprise providing, to a neural network comprising an encoder-decoder structure having an encoder portion and a decoder portion, the estimated hyperspectral datacube of the scene and the unsheared image of the scene. Reconstructing a hyperspectral datacube corresponding to the scene using the spectrally unsheared image and the at least one spectrally sheared image may comprise determining an enhanced hyperspectral datacube of the scene from the estimated hyperspectral datacube and the unsheared image of the scene.

The estimated cube may come from either a prior point step in the reconstruction model or an external source.

In this context an external source is defined as any hyperspectral dataset collected or estimated by means outside of the scope of the reconstruction algorithm/model. This extension can be made because the secondary refinement reconstruction (the combined reconstruction) can act on any hyper-spectral dataset, i.e. not just the result of the prior reconstruction attempt. In addition, this can be further extended to include any set of features or data cubes produced by prior steps in the reconstruction, provided they are of the expected shape.

Reconstructing an enhanced hyperspectral datacube of the scene from an estimated hyperspectral datacube may improve inference time (e.g., decrease reconstruction time) of the enhanced hyperspectral datacube, by separating the reconstruction of the hyperspectral datacube into two stages. That approach may also provide an improved reconstructed hyperspectral datacube. Instead of starting from detected raw data, information from both the estimated hyperspectral datacube and the spectrally unsheared image of the scene may be utilised to reconstruct the enhanced hyperspectral datacube. The estimated hyperspectral datacube may comprise features or information already extracted of inferred from the detected raw data, which can be leveraged and combined with the spectrally unsheared image of the scene.

The method may alternatively be performed using a plurality of spectrally sheared images of the scene, for example a plurality of estimated hyperspectral datacubes. The method may be performed without a spectrally unsheared image of the scene. The plurality of estimated hyperspectral datacubes may correspond to a plurality of different spectrally sheared views of the scene. Performing a tomographic reconstruction using a plurality of estimated hyperspectral datacubes may enable different information (for example, different sets of extracted features from the detected raw data, or information from multiple different views of the scene) to be leveraged to improve or enhance a reconstruction of the hyperspectral datacube.

The method may comprise performing a plurality of convolution operations using the encoder portion. The method may comprise performing a plurality of transpose convolution operations using the decoder portion.

The method may comprise performing a plurality of successive dilated convolution operations using either the encoder or decoder portions. A dilation rate may increase with each successive dilated convolution operation. A plurality of successive dilated convolution operations may provide a more compact neural network without any substantial loss in output resolution. A more compact neural network may improve reconstruction speed of the hyperspectral datacube.

The method may comprise determining the estimated hyperspectral datacube using the method of the fourth aspect or of the fifth aspect.

The method may comprise not providing mask information used to encode a spectrally sheared image of the scene to the neural network. The method may comprise providing the mask information to the neural network indirectly. The method may comprise providing the mask information to the neural network indirectly via the estimated hyperspectral datacube determined using the method of the fifth aspect.

A plurality of successive convolution operations may be densely connected. A dense connection between preceding, non-adjacent convolution layers in the neural network may assist in stabilising learning. The dense connection may alternatively or additionally enable the transfer of higher frequency features from previous, non-adjacent layers in the neural network to be utilised. An output of each preceding densely connected convolution operation may be provided as an input to a subsequent densely connected convolution operation. The outputs of each preceding densely connected convolution operation may be concatenated to provide the input to the subsequent densely connected convolution operation.

The decoder portion may comprise a self-attention block configured to receive a final output of the encoder portion.

The method may comprise performing spatially adaptive normalisation and/or Inverted attention normalisation on an output of at least one of the convolution operations and/or transpose convolution operations using the unsheared image of the scene. SPADE and/or Inverted attention normalisation using the sheared or unsheared image of the scene may leverage the information provided by the unsheared image. That may enhance a spatial resolution of the enhanced hyperspectral datacube.

The method may comprise reconstructing the hyperspectral datacube using hierarchical channel reconstruction.

The method may comprise of a relative normalisation transformation, in which the sigmoid operation may be applied to a reconstructed hypercube. The result of the sigmoid operation may be divided by a reduce sum of itself along its final axis.

The Reduced Sum is Defined as:

$$r_{i,j,k} = \frac{z_{i,j,k}}{\sum_{k=1}^{n} z_{i,j,k}}$$

i.e. summing each pixel location along the last axis of the array and dividing each element through by the reduced sum at every pixel position.

According to an aspect, there is provided a computer-implemented method of training the neural network of the fifth aspect. The method may comprise training the neural network using generative adversarial learning.

The method may comprise training the neural network using a cGAN, conditional GAN, loss function.

According to a further aspect, there is provided a computer-implemented method of training the neural network of the seventh aspect or of the eighth aspect. The method may comprise training the neural network using one or more hyperspectral specific loss functions.

The method may comprise training the neural network using at least one of:
    i) a SSIM, Structural Similarity Index Measure, loss function; and
    ii) a SID, Spectral Information Divergence, loss function; and
    iii) an HCR, Hierarchical Channel Reconstruction, loss function. And
    iv) relative normalised loss function.

The method may comprise training the neural network using a weighted sum of at least two different loss functions.

According to an eighth aspect, there is provided a computer-implemented method of training the neural networks of the third aspect, fourth aspect or fifth aspect separately from the neural network of the seventh aspect.

The method may comprise training the neural network for determining the enhanced hyperspectral datacube separately from training the neural network for determining the estimated hyperspectral datacube.

The method may comprise training the neural network for determining an enhanced hyperspectral datacube using the method of the eighth aspect or of the ninth aspect. The method may comprise training the neural network for determining the estimated hyperspectral datacube using the method of the sixth aspect.

According to an aspect, there is provided a computer or processor configured to perform the method according to any of the third to tenth aspects, including any of the optional features thereof.

The method described above may be used outputs from a hyperspectral imaging device comprising an input for receiving a light field from a scene, an encoder, at least one dispersive element, at least one array detector and a processor. The encoder is arranged to receive at least a portion of the light field from the input and transform it to provide first and second encoded light fields having different spatial patterns. The at least one dispersive element is arranged to apply second spectral shear to the first and second encoded light fields respectively to provide first and second sheared light fields. The at least one array detector is arranged to detect the first and second sheared light fields. The processor is arranged to process an output from the at least one array detector to determine a datacube corresponding to a hyperspectral image of the scene.

The imaging device may be configured to obtain the datacube from a single shot (e.g. one frame of data from the first and second array detectors). In some embodiments the imaging device may be configured to obtain the datacube from more than one shot (for example, from two shots, three shots or more).

The provision of more than one encoding pattern in the detected light fields enables a tomographic reconstruction of the original hyperspectral datacube thereby enhancing fidelity over approaches in which a data is captured based on a single encoding pattern.

The encoder may be arranged to receive undispersed or unsheared light from the scene. The encoder may be arranged such that the at least a portion of the light field from the scene that is received at the encoder is substantially undispersed or unsheared. No dispersion of the light field from the scene may be required or take place before encoding of the light field from the scene. For example, the light field may not pass through a dispersive element such as a prism before it is received by the encoder.

The at least one array detector may be arranged to detect spectrally dispersed light. The sheared light fields detected by the at least one array detector may be spectrally dispersed. The sheared light fields may not be recombined to form a spectrally undispersed light field prior to detection at the least one array detector. The captured signal may consist of a sum of multiple shifted images of a scene, with each image shifted according to its wavelength.

In some embodiments, more than two encoded light fields may be provided and detected, for example, there may be four different encoded light fields (and each may have a different encoding).

In some embodiments, there may be a single detector, and a reconfigurable encoder arrangement. In such an embodiment, first and second spatial patterns may be temporally separated, with the encoder reconfigured between detection of the first and second sheared light fields. A single dispersive element may be used in such an embodiment (e.g. between the reconfigurable encoder and the single detector).

In other embodiments, the encoder may be arranged to provide spatially separated first and second encoded light fields.

A resolution of the detector may be equal to or greater than a resolution of the encoder. A frame rate of hyperspectral image capture using the device of the first aspect may be limited only by a frame rate of the detector (e.g., camera system or sensor) used. For example, if a frame rate of the detector is 200 Hz, the frame rate of the determined or reconstructed hyperspectral datacube may be also 200 Hz.

The first and second light fields may comprise complementary spatial patterns (whether the first and second encoded light fields are spatially or temporally separated). The complementary spatial patterns may be complementary random or pseudorandom spatial patterns.

The encoder may be configured to reflect the first and second encoded light fields in different directions.

Some embodiments may combine spatial and temporal separation of encoded light fields, detecting both temporally and spatially separated encoded light fields (e.g. by a reconfigurable encoder that provides spatially separated first and second light fields, and collecting more than one shot from the detectors, with different encoder patterns).

Advantageously, the generation of first and second copies of the light field which are encoded with complementary spatial patterns and separately sheared prior to detection provides for greater fidelity in the datacube reconstruction. This is analogous to tomography whereby the first and second copies effectively correspond to projections of the datacube along different directions, thereby providing additional information about the datacube than if only a single sheared and encoded copy were used. The copies of the light field are of identical scenes. No further segmentation of the light field from the scene is required. The combination of encoding and shearing with detection of two or more copies may be referred to as compressive tomography.

The at least one dispersive element may comprise a first dispersive element configured to apply a first spectral shear to the first encoded light field, and a second dispersive element configured to apply a second spectral shear to the second encoded light field.

The at least one dispersive element may be or comprise a transmissive dispersive element. One or both of the first and second dispersive elements may be a transmissive dispersive element.

The first and second spectral shears may have different magnitudes.

The first and second spectral shears may have different spatial directions. The first and second dispersive elements may be respectively configured to spectrally shear the first and second encoded light fields in different directions. The first dispersive element may be configured to spectrally shear the first encoded light field in a first spatial direction, and the second dispersive element may be configured to spectrally shear the second encoded light field in a second spatial direction different to the first spatial direction.

The encoder may comprise a digital micromirror device, a static mask, a liquid crystal device (e.g. liquid crystal on silicon).

The encoder may be or comprise a transmissive encoder. The encoder and the at least one dispersive element may both be transmissive. Using transmissive components may enable easier miniaturisation of the hyperspectral imaging device, and in particular when performing compressive tomography.

The encoder may comprise a first encoder portion configured to provide the first encoded light field and a second encoder portion configured to provide the second encoded light field. The first and second encoder portions may be disposed on or along respective first and second discrete imaging paths. The first and second discrete imaging paths may be parallel to one another. Discrete imaging paths may remove the need for reflective elements such as a beam splitter, which may further enable easier miniaturisation of the hyperspectral imaging device.

The first and second dispersive elements may be disposed on the respective first and second discrete imaging paths.

The hyperspectral imaging device may further comprise a spectral encoder configured to spectrally encode the first and second sheared light fields prior to detection by the at least one array detector. This allows the hyperspectral imaging device to encode in both the spatial and spectral domains. This provides an additional degree of freedom in encoding, which may allow for a higher degree of incoherence (randomness) in the sampling of the datacube and in turn may improve reconstruction of the datacube.

The spectral encoder may comprise a first spectral encoder portion configured to spectrally encode the first sheared light field, and a second spectral encoder portion configured to spectrally encode the second sheared light field. The first and second spectral encoder portions may be disposed on or along the respective first and second discrete imaging paths. The spectral encoder may be a transmissive encoder.

The at least one array detector may comprise a first and second array detector, respectively arranged to detect the first and second sheared light fields.

The hyperspectral imaging device may further comprise a beam splitter and a third array detector, wherein the beam splitter is arranged between the input and the encoder and is arranged to provide a portion of the light field to the third array detector and the remaining portion of the light field to the encoder.

The portion of the light field provided to the third array detector may be unsheared (or spectrally undispersed).

The hyperspectral imaging device may further comprise a focusing or relay element located between the input and the encoder.

The focusing element may be arranged to image the scene onto the encoder.

At least one of the dispersive elements may comprise a concave grating.

The at least one dispersive element may comprise a combination of a focusing element (e.g. refractive or reflective) and a planar grating. The planar grating may comprise a transmissive grating, double Amici prism etc.

The at least one dispersive element may be arranged to image the first and second sheared light fields onto the at least one array detector respectively. For example, the first and second dispersive element may be configured to respectively image the first and second sheared light fields on the first and second array detectors.

The encoder and the at least one dispersive element may be integrated into a single component. The single component may be configured to provide first and second light fields which are both encoded and sheared. This may further enable easier miniaturisation of the hyperspectral imaging device.

The integrated encoder and at least one dispersive element may comprise an encoding pattern disposed on the at least one dispersive element. The at least one dispersive element may be a diffraction grating. The encoding pattern may be lithographically printed onto the at least one dispersive element.

The processor may be arranged to determine the datacube by solving a minimization problem.

The minimization problem may comprise a regularizer that promotes sparsity.

The processor may be arranged to solve a minimization problem of the form:

$$\min_I \left\{ \frac{1}{2} \left\| [S_1, S_2]^T - [k_1 o_1, k_2 o_2]^T I \right\|^2 + \alpha \phi(I) \right\}$$

where $S_1$ is the signal detected by the first detector, $S_2$ is the signal detected by the second detector, $k_1$ and $k_2$ are weighting factors, $o_1$ and $o_2$ are measurement operators dependent on the encoder and first and second dispersive elements, $\phi(I)$ is a regularizer that promotes sparsity, $\alpha$ is a regularization parameter, $\|\cdot\|$ denotes the $l^2$ norm and $I=I(x, y, \lambda)$ is the datacube.

The processor may be further arranged to process an output from the third detector jointly with the outputs from the first and second detectors to determine the datacube. In such embodiments, the processor may be arranged to solve a minimization problem of the form:

$$\min_I \left\{ \frac{1}{2} \left\| [S_1, S_2, S_3]^T - [k_1 o_1, k_2 o_2, k_3 o_3]^T I \right\|^2 + \alpha \phi(I) \right\}$$

where $S_1$ is the signal detected by the first detector, $S_2$ is the signal detected by the second detector, $S_3$ is the signal detected by the third detector, $k_1$, $k_2$ and $k_3$ are weighting factors, $o_1$, $o_2$ and $o_3$ are measurement operators dependent on the encoder, the first and second dispersive elements and the beam splitter, $\phi(I)$ is a regularizer that promotes sparsity, $\alpha$ is a regularization parameter, $\|\cdot\|$ denotes the $l^2$ norm and $I=I(x, y, \lambda)$ is the datacube.

According to another aspect of the present disclosure there is provided a method of hyperspectral image acquisition, comprising:

receiving a light field from a scene;
  transforming the light field to provide first and second encoded light fields having different spatial patterns;
  applying spectral shear to the first and second encoded light fields respectively to provide first and second sheared light fields;
  detecting the first and second sheared light fields respectively to provide detection data; and
  processing the detection data to determine a datacube corresponding to a hyperspectral image of the scene.

The features (including optional features) of any aspect may be combined with those of any other aspect, as appropriate. The features described with reference to the imaging device of the first aspect may be used in the method of the second aspect (e.g. the method may obtain the datacube from a single shot etc).

BRIEF DESCRIPTION OF THE DRAWINGS

Example embodiments will be described, by way of example only, with reference to the drawings, in which.

It should be noted that the Figures are diagrammatic and not drawn to scale. The same reference signs are generally used to refer to corresponding or similar feature in modified and different embodiments.

DETAILED DESCRIPTION

Figure 1:
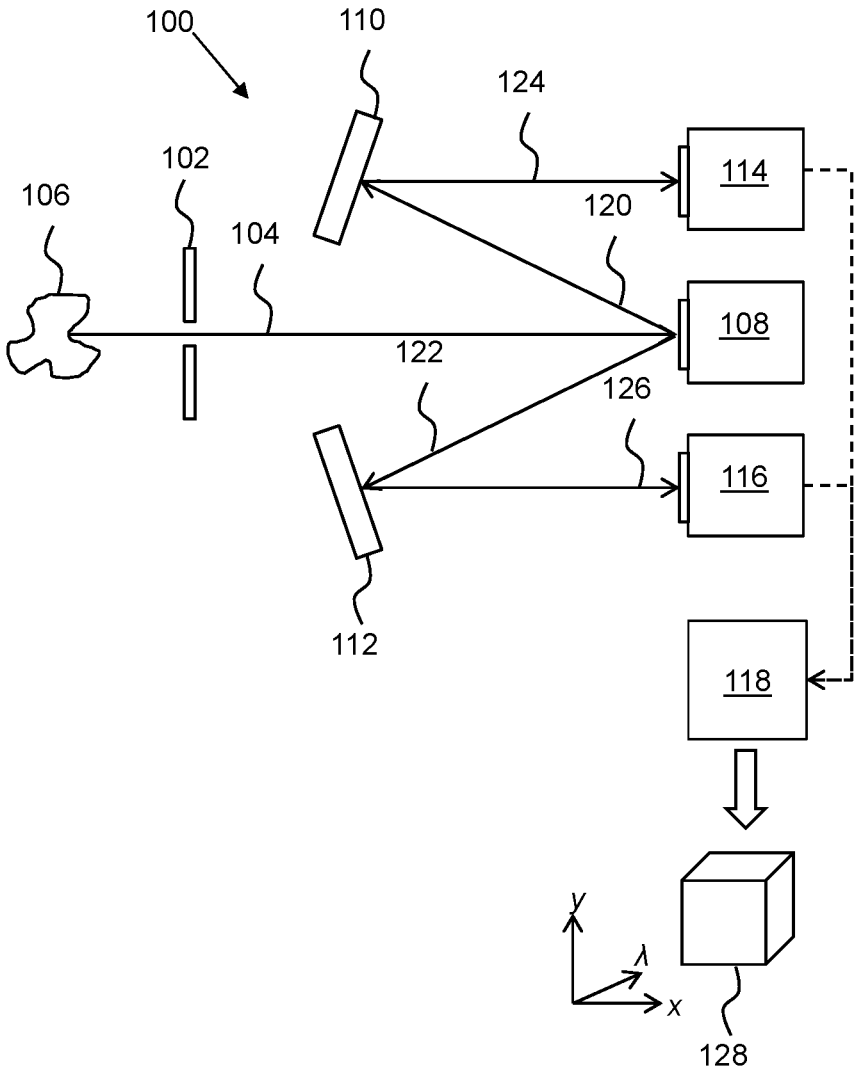
FIG. 1 is a schematic of a hyperspectral imaging device according to an embodiment of the present disclosure, employing a reflective encoder.

FIG. 1 illustrates a hyperspectral imaging device 100 according to an embodiment of the present disclosure. The hyperspectral imaging device 100 is capable of single shot hyperspectral imaging. The hyperspectral imaging device 100 comprises an input 102 for receiving a light field 104 from a scene 106, an encoder 108, first 110 and second 112 dispersive elements, first 114 and second 116 array detectors and a processor 118.

The input 102 may comprise an aperture (for example, or a slit), and is configured to direct light from the scene toward the encoder 108.

The encoder 108 is arranged to receive at least a portion of the light field 104 from the input and transform it to provide spatially separated first 120 and second 122 encoded light fields having unique and distinct binary spatial patterns. The encoder 108 may be a binary encoder comprising an array of reflective elements (e.g. mirrors) that direct light either in a first direction 120, or in a second direction 122, different to the first direction 120. For example, the encoder 108 may consist of a plurality of a first type of reflective element and a plurality of a second type of reflective element. There may be similar (e.g. equal) numbers of the first and second type of reflective element, but this is not essential. The first type of element may be configured to reflect light incident on the encoder 108 in the first direction 120. The second type of element may be configured to reflect light incident on the encoder 108 in the second direction 122. The light reflected in the first direction 120 comprises a first encoded light field, and the light reflected in the second direction comprises a second encoded light field.

In some embodiments the reflective elements may be fixed (for example, the encoder 108 may comprise a fixed mirror array). In other embodiments the pattern of the first and second type of reflective element may be reconfigurable. For example, the encoder 108 may comprise an array of moveable micro-mirrors, such as a digital micro-mirror device (which are rapidly moveable between a first angular position and a second angular position). A reconfigurable encoder 108 may be advantageous, since additional information about a relatively slowly changing scene may be obtained by using different encoding patterns and combining the resulting data in order to obtain a hyperspectral image cube (i.e. using more than one shot).

In other embodiments, the encoder 108 may not be entirely reflective. For example, in some embodiments a beam splitter may be used to provide light to a first array of apertures and to a second array of apertures, complementary to the first array. The encoder in this sort of embodiment comprises the first and second array of apertures. In some embodiments, a partially reflective encoder may be employed, in which a proportion (e.g. 50%) of the incident light is encoded and transmitted, and a proportion of the incident light is encoded and reflected.

Returning to FIG. 1, the first and second dispersive elements 110, 112 are arranged to apply first and second spectral shears to the first and second encoded light fields respectively to provide first 124 and second 126 sheared light fields. The dispersive elements 110, 112 may comprise reflective dispersive elements such as diffraction gratings, but any dispersive element may be used (including transmissive dispersive elements). It may be advantageous for the first and second spectral shears to be different (for example, positive and negative), but this is not essential.

The first and second dispersive elements 110, 112 may be curved diffraction gratings, configured to image the first and second sheared light fields onto the respective detectors. In other embodiments, the first and second dispersive elements 110, 112 may each comprise a flat diffraction grating and a focusing element (e.g. a lens or mirror), with the focusing element configured to image the sheared light field onto the detector.

The first and second array detectors 114, 116 are arranged to detect the first and second sheared light fields respectively. The processor 118 is arranged to process outputs from the first and second detectors 114, 116 to determine a datacube 128 corresponding to a hyperspectral image of the scene.

The two sheared light fields 124, 126 may be expressed as:

$$S_1(x, y) = \sum_\lambda (a_1 * I)(x, y + c_1\lambda, \lambda) \qquad (1), (2)$$

$$S_2(x, y) = \sum_\lambda (a_1 * I)(x, y + c_2\lambda, \lambda)$$

where the subscripts 1 and 2 denote the first and second sheared light field respectively, and coefficients $\alpha$ represent systematic aberrations and filtering, and coefficients c represent the dispersion from the respective dispersive element. Note that the coefficients $c_1$ and $c_2$ need not have opposite signs. I denotes the input datacube I(x, y, $\lambda$).

Reconstruction of the hyperspectral datacube 128 may be performed by the processor 118. The data acquisition process may be expressed as:

$$[S_1, S_2]^T = [k_1 o_1, k_2 o_2]^T I(x, y, \lambda) \qquad (3)$$

where S is the signal detected at the respective detector, coefficients k are scaling factors to balance the intensity differences between the signals and the 'o's represent the measurement operators for the signals. Image reconstruction within the compressed sensing framework may be conducted by solving the minimisation problem:

$$\min_I \left\{ \frac{1}{2} \left\| [S_1, S_2]^T - [k_1 o_2, k_2 o_2]^T I \right\|^2 + \alpha\phi(I) \right\} \qquad (4)$$

where $\phi(I)$ is a regularizer that promotes sparsity, $\alpha$ is a regularization parameter, $\|\cdot\|$ denotes the $l^2$ norm and I=I(x, y, $\lambda$) is the datacube. The minimisation problem posed in (4) may be solved using an existing methodology (e.g. TwIST, LASSO, wavelet deconvolution etc).

The use of a complementary encoding scheme with two detectors enables a single shot hyperspectral image to be obtained in which none of the incident light is wasted, and which enables efficient tomographic reconstruction of the hyperspectral datacube, because the encoding of the light detected at the first and second detector is complementary.

Figure 2:
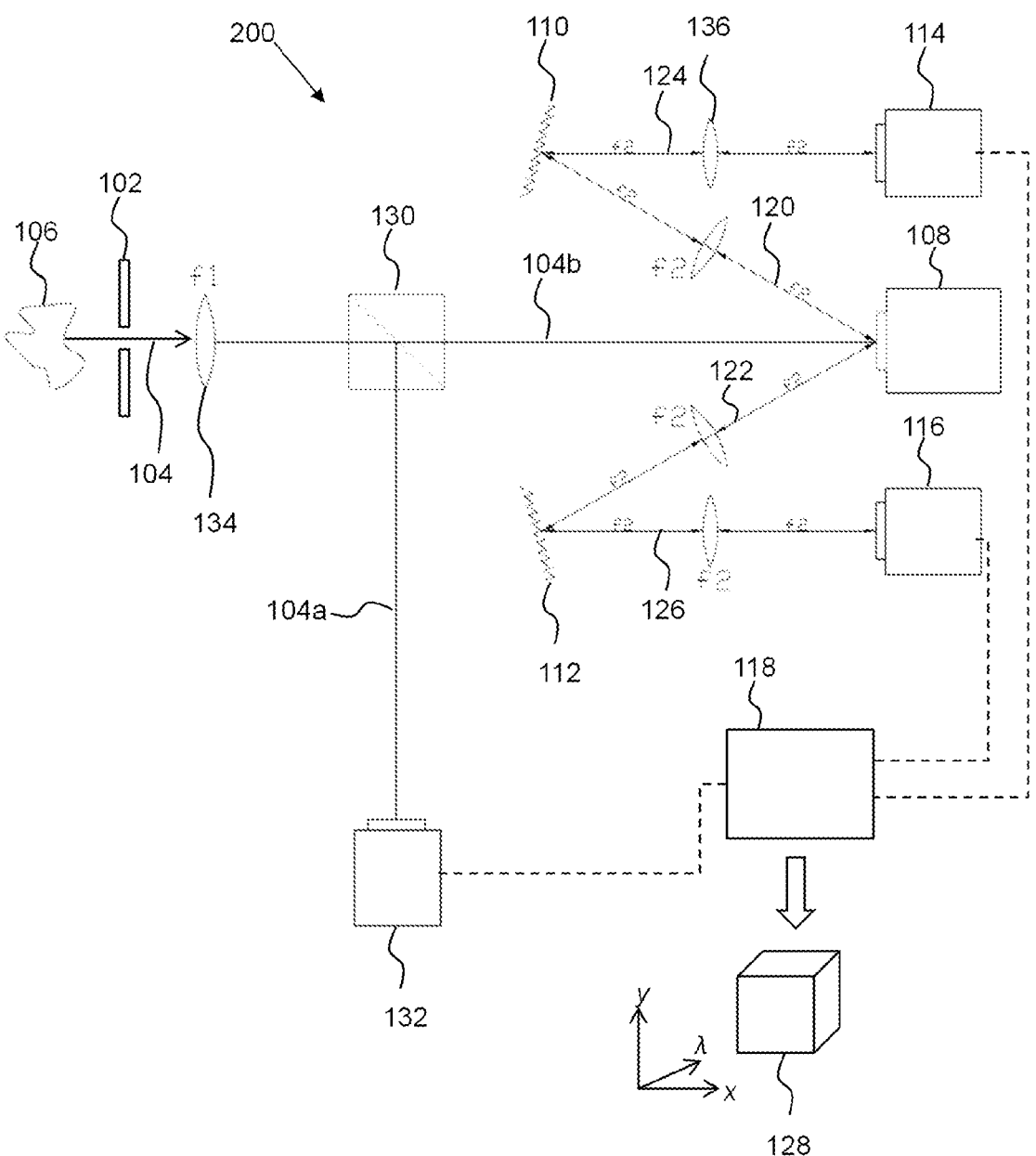
FIG. 2 is a schematic of a hyperspectral imaging device according to another embodiment.

FIG. 2 shows a further embodiment 200, in which a beam splitter 130 is also provided. Furthermore, lenses 134, 136 are included (not all of which are labelled). The description of elements with the same reference numerals in FIG. 1 are equally applicable to FIG. 2.

The beam splitter 130 which splits the light field 104 into a first portion 104*a* and a second portion 104*b*. The second portion 104*b* is directed towards the encoder 108 whereas the first portion 104*a* is directed towards a third array detector 132. The third array detector 132 may be configured to take a direct image (i.e. the sum of the intensities from an un-sheared image over the full spectral range at each x, y pixel position). The signal detected by the third detector may be expressed as:

$$S_3(x, y) = \sum_\lambda (a_3 * I)(x, y, \lambda) \qquad (5)$$

The data acquisition process with the additional third detector may be expressed as:

$$[S_1, S_2, S_3]^T = [k_1 o_1, k_2 o_2, o_3]^T I(x, y, \lambda) \qquad (6)$$

The reconstruction of the image datacube may be conducted by solving the minimisation problem (which uses similar notation to (4)):

$$\min_I \left\{ \frac{1}{2} \left\| [S_1, S_2, S_3]^T - [k_1 o_1, k_2 o_2, k_3 o_3]^T I \right\|^2 + \alpha \phi(I) \right\} \tag{7}$$

In the embodiment of FIG. 2, the focusing lens 134 is shown, which focuses the light from the input 102 at the encoder 108 and the third detector 132. Such a focusing lens may also be used in the embodiment of FIG. 1 to focus light at the encoder 108. Although a refracting lens is shown, a focusing element comprising a reflector may alternatively be used.

The addition of the third detector, which obtains a direct image, provides further information for the reconstruction of the hyperspectral datacube. This direct image is also straightforward to compare visually with the output datacube to provide confidence that this is correct.

Also depicted in FIG. 2 are two focusing lenses 136 for each of the optical paths from the encoder 108 to the first and second array detectors 114, 116. A similar arrangement of lenses may also be used in the embodiment of FIG. 1. A lens between the encoder 108 and the first dispersive element 110 collimates the light from the encoder 108 at the first dispersive element 110. A further lens 136 between the first dispersive element 110 and the first array detector 114 focusses the light from the first diffractive element 110 at the first array detector 114. A similar arrangement is used for the other detection path (leading to the second array detector 116).

Preferably, the lenses are matched, with focal length f2, so that the distance from the dispersive element 110, 112 to the encoder 108 and the array detector 114, 116 is the same (with the lenses placed halfway between the encoder and dispersive element, and halfway between the dispersive element and the first array detector).

Although refractive lenses are depicted in the example embodiment of FIG. 2 (which may be readily available, compact and low cost), reflective elements may be used instead, which may be advantageous in that they will tend not to introduce any unwanted dispersion.

Figure 3:
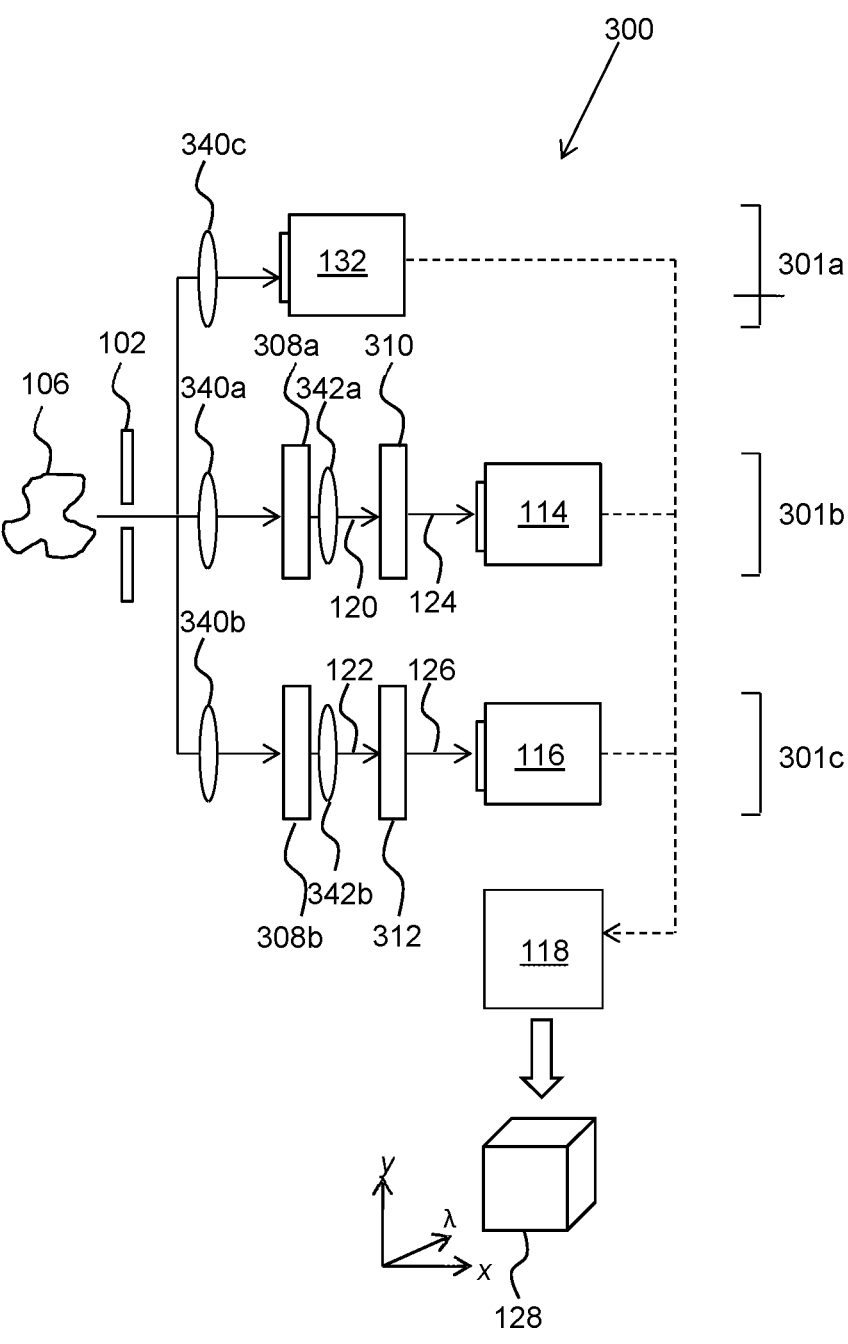
FIGS. 3 and 4 are schematics of a hyperspectral imaging device according to an embodiment in which the encoder comprises a plurality of transmissive encoder portions.

FIG. 3 shows another embodiment of a hyperspectral imaging device 300. The description of elements with the same or like reference numerals in FIGS. 1 and 2 are equally applicable to FIG. 3. The hyperspectral imaging device 300 comprises an input 102 for receiving a light field 104 from a scene 106, an encoder 308, first 310 and second 312 dispersive elements, first 114, second 116 and third 132 array detectors and a processor 118. The hyperspectral imaging device 300 operates using the same principles as for the hyperspectral imaging devices 100, 200 described above, but utilises transmissive components rather than reflective components. Use of transmissive components may enable easier miniaturisation (and potentially reduced cost) of the hyperspectral imaging device 300, by avoiding use of reflective components (such as digital micro-mirror devices, beam splitters and reflective diffraction gratings), and in particular when performing compressive tomography.

In the embodiment shown, the hyperspectral imaging device 300 comprises first 301a, second 301b and third 301c discrete, separate imaging paths from the scene 106 to the respective array detectors 114, 116, 132. In the embodiment shown, the discrete imaging paths 301a, 301b, 301c are parallel to one another to avoid the need for a beam splitter, which may further ease miniaturisation of the hyperspectral imaging device 300. The direction of the arrows from the input 102 along each imaging path 301a, 301b and 301c are schematic in nature and do not necessarily illustrate the physical path of light through the hyperspectral imaging device 300.

The encoder 308 comprises a first encoder portion 308a and a second encoder portion 308b. The first encoder portion 308a operates as part of the first discrete imaging path 301a, in conjunction with the first dispersive element 310 and the first array detector 314. In the embodiment shown, an imaging lens 340a is located between the input 102 and the first encoder portion 308a, and a relay lens 342a is located between the first encoder portion 308a and the first dispersive element 310. In other embodiments, the imaging lens 340a and the relay lens 342a may be omitted. Similarly, the second encoder portion 308b operates as part of the second discrete imaging path 301b, in conjunction with the second dispersive element 312 and the second array detector 116. In the embodiment shown, an imaging lens 340b is located between the input 102 and the second encoder portion 308b, and a relay lens 342b is located between the second encoder portion 308b and the second dispersive element 312. In other embodiments, the imaging lens 340b and the relay lens 342b may be omitted.

The first 108a and second 108b encoder portions are each arranged to receive at least a portion of the light field 104 from the input 102 and transform it to provide respective first 120 and second 122 encoded light fields. The first 120 and second 122 encoded light fields have different spatial patterns. In the embodiment shown, the first 308a and second 308b encoder portions are transmissive encoders, for example first and second arrays of apertures or masks. In some embodiments, the first 308a and second 108b encoder portions are complementary to one another to produce first 120 and second 122 encoded light fields comprising complementary spatial patterns, but this is not essential.

The first 110 and second 112 dispersive elements are arranged to apply first and second spectral shears to the first 120 and second 122 encoded light fields respectively, to provide first 124 and second 126 sheared light fields. In the embodiment shown, the first 110 and second 112 dispersive elements are each transmissive dispersive elements, such as a transmissive diffraction grating. It may be advantageous for the first and second spectral shears to be different (for example, positive and negative), but this is not essential.

The first 114 and second 116 array detectors are arranged to detect the first 124 and second 126 sheared light fields respectively. The processor 118 is arranged to process outputs from the first 114 and second 116 detectors to determine a datacube 128 corresponding to a hyperspectral image of the scene. The processor 118 may reconstruct the hyperspectral datacube 128 according to equations (1) to (7) discussed above.

The third discrete imaging path 301c runs from the input to the third array detector 132 which provides a direct image of the scene 106, providing further information for the reconstruction of the hyperspectral datacube 128. The direct image is straightforward to compare visually with the output datacube 128 to provide confidence that the datacube 128 is correct. In the embodiment shown, an imaging lens 340c is located between the input 102 and the third array detector 132. In some embodiments, the imaging lens 340c may be omitted. In some embodiments, the third imaging path 301c may not be present, or may not be utilised.

Figure 4:
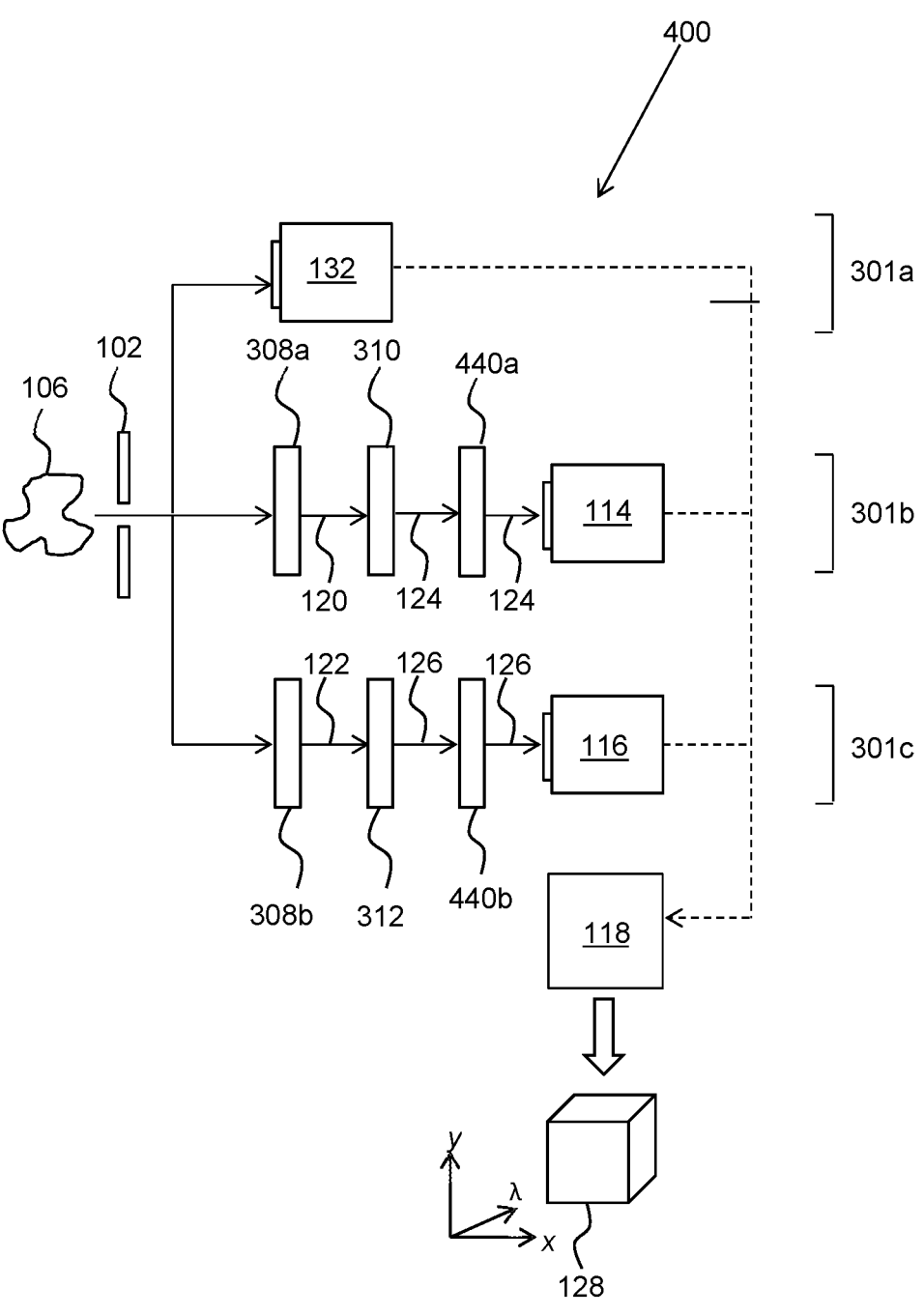

FIG. 4 shows a further embodiment of a hyperspectral imaging device 400. The hyperspectral imaging device 400 is substantially similar to the hyperspectral imaging device 300 described above, although the imaging and relay lenses are not depicted.

The hyperspectral imaging device 400 further comprises a spectral encoder 440. The spectral encoder 440 is configured to spectrally encode the first 124 and second 126 sheared light fields prior to their detection by the first 114 and second 116 array detectors respectively. In the embodiment shown, the spectral encoder 440 is arranged after the respective dispersive elements 310, 312 in the first 301a and second 301b imaging paths. In the embodiment shown, similar to the encoder 308, the spectral encoder 440 comprises a first spectral encoder portion 440a configured to spectrally encode the first sheared light field 124, and a second spectral encoder portion 440b configured to spectrally encode the second sheared light field 126. The first spectral encoder portion 440a operates as part of the first imaging path 301a, while the second spectral encoder portion 440b operates as part of the second imaging path 301b. In some embodiments, the first 440a and second 440b spectral encoder portions are complementary to one another, but this is not essential.

In the embodiment shown, the spectral encoder 440 is a transmissive encoder, for example one or more arrays of apertures. As described above, use of transmissive components may enable easier miniaturisation of the hyperspectral imaging device 400. In other embodiments, the spectral encoder may be a reflective encoder, for example a digital micro-mirror device.

The hyperspectral imaging device 300 described above only encodes in the spatial domain using the encoder 308. The spectral encoder 440, in conjunction with the encoder 308 enables the hyperspectral imaging device 400 to encode in both the spatial and spectral domains. An additional degree of freedom in encoding may allow for a higher degree of incoherence (randomness/orthogonality) in the sampling of the datacube 128, which may improve reconstruction.

Alternatively, the spectral encoder 440 may be used independently of the encoder 308 (which may be omitted from the hyperspectral imaging device 400) in order to provide only spectral encoding. It will also be appreciated that a spectral encoder (such as spectral encoder 440) could be implemented in the hyperspectral imaging devices 100, 200 described above. The spectral encoder may be implemented as a single spectral encoder, or as a plurality of spectral encoder portions. For example, if the first 120 and second 122 encoded light fields (and consequently the first 124 and second 126 sheared light fields) are temporally separated, a single spectral encoder 440 may be employed to spectrally encode the first 124 and second 126 sheared light fields.

Figure 5:
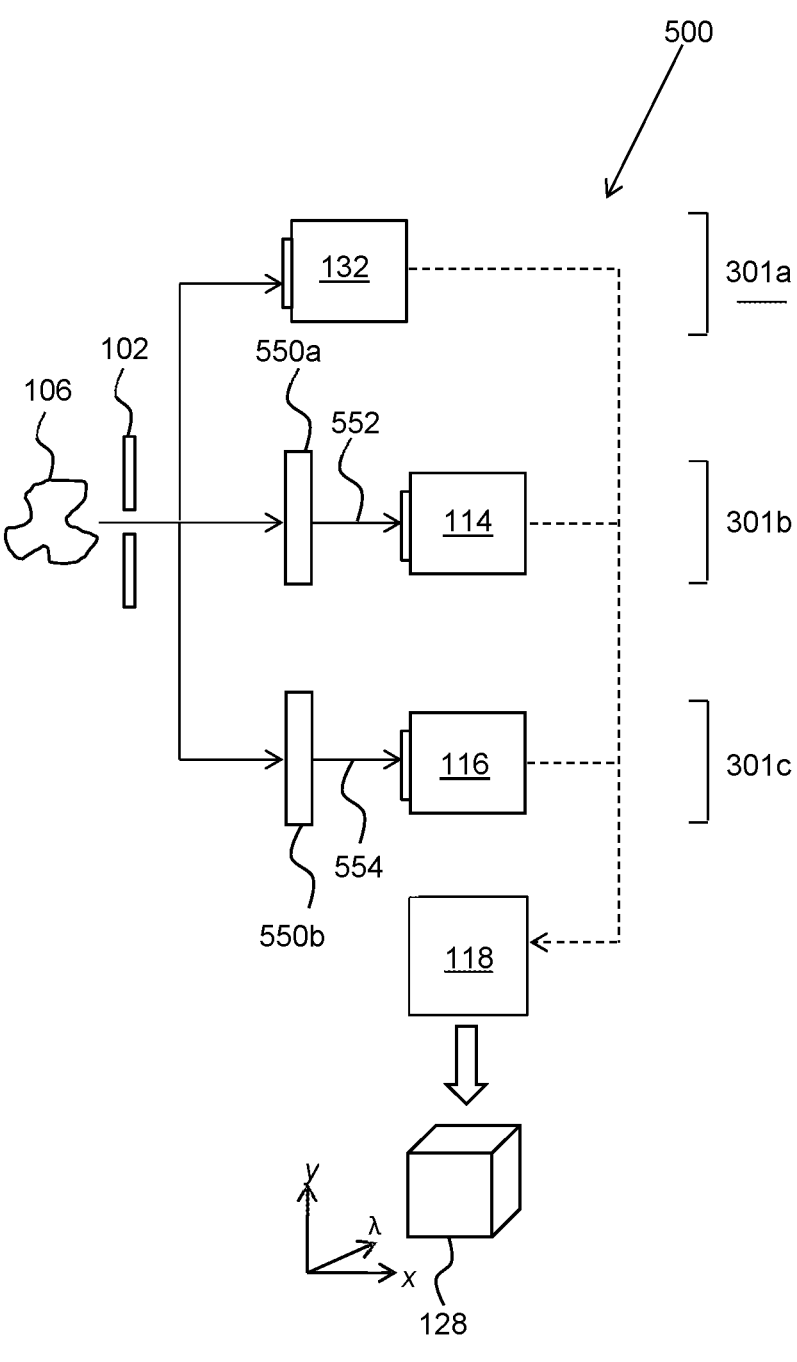
FIG. 5 is a schematic of a hyperspectral imaging device according to an embodiment in which the encoder and dispersive elements are combined.

In the above described embodiments, encoding and dispersion is performed by two discrete, separate components, namely the encoder 108, 308 and the at least one dispersive element 110, 112, 310, 312. FIG. 5 shows an embodiment of a hyperspectral imaging device 500. The hyperspectral imaging device 500 is similar to the embodiments shown in FIG. 3 and FIG. 4.

However, in the embodiment shown in FIG. 5, the encoder 308 and the at least one dispersive element 310, 312 are integrated into a single component. The single component is an integrated encoding and dispersion element 550. The integrated encoding and dispersion element 550 provides first 552 and second 554 light fields which are both encoded and sheared. Effectively, the integrated coding and dispersion element 550 provides both the first encoded light field 120 and the first sheared light field 124 as a single first encoded and sheared light field 552 (and correspondingly the second encoded light field 122 and the second sheared light field 126 as a single second encoded and sheared light field 554).

In the embodiment shown, the first encoder portion 308a and the first dispersive element 310 on the first imaging path 301a have been replaced have been replaced by a first integrated encoding and dispersion element 550a (and correspondingly second encoder portion 308b and second dispersive element 312 on the second imaging path 301b by an integrated encoding and dispersion element 550b).

In the embodiment shown, the integrated encoder and dispersive element 550 is a transmissive component. In some embodiments, the integrated encoding and dispersion element 550 may comprise a dispersive element (for example, a diffraction grating such as a transmissive diffraction grating) on which an encoding pattern is disposed (for example, using a lithographic process).

The integrated encoding and dispersion element 550 shortens the beam paths in the discrete imaging paths 301a, 301b of the hyperspectral imaging device 500, which may further enable easier miniaturisation of the hyperspectral imaging device 500.

Optionally, a spectral encoder such as spectral encoder 440 described above may be used in conjunction with the integrated encoding and dispersion element 550 in order to encode in both the spatial and spectral domains.

Figure 6:
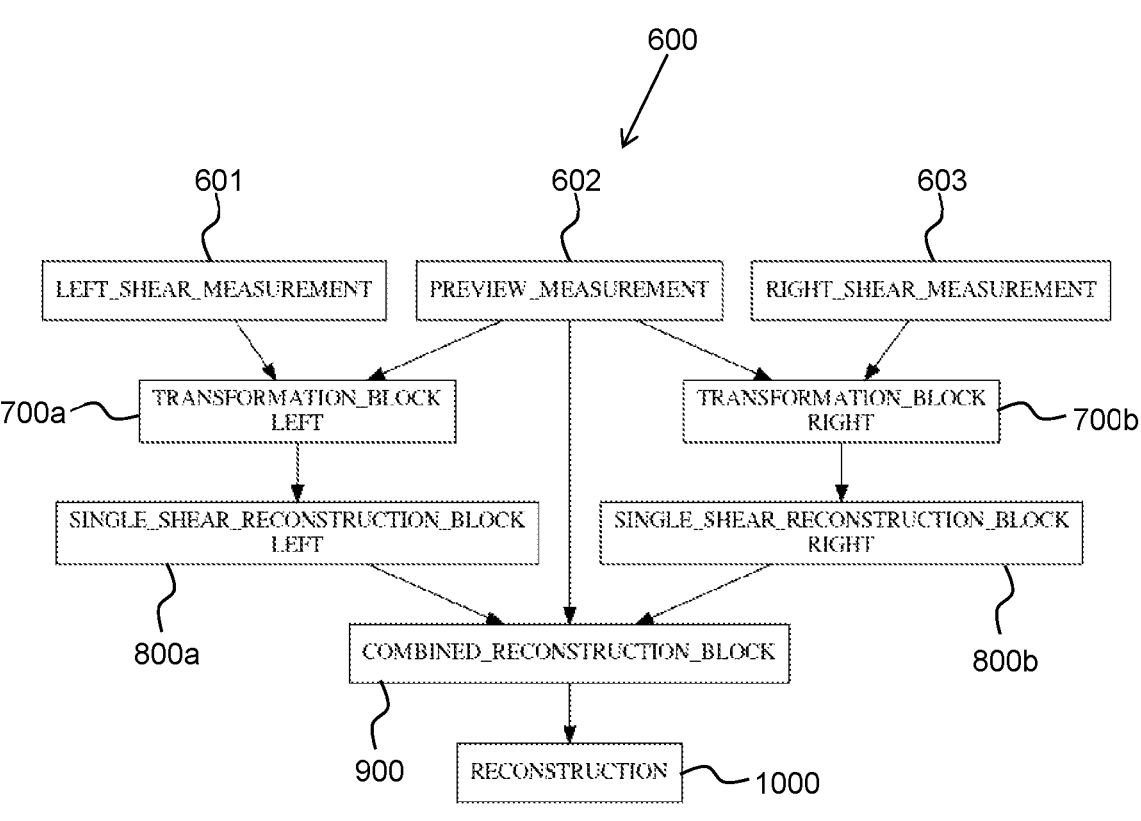
FIG. 6 is a block diagram of a computer implemented method for determining a hyperspectral datacube.

FIG. 6 shows an alternative approach according to the invention for reconstructing a hyperspectral datacube using outputs from the hyperspectral imaging devices 100-500 described above (which may also be applicable in other contexts). The alternative approach comprises using machine learning for hyperspectral datacube reconstruction rather than a compressed sensing reconstruction.

FIG. 6 shows an architecture for an embodiment of a machine learning model 600 for reconstructing a hyperspectral datacube using outputs from the hyperspectral imaging devices 100-500.

Figure 11:
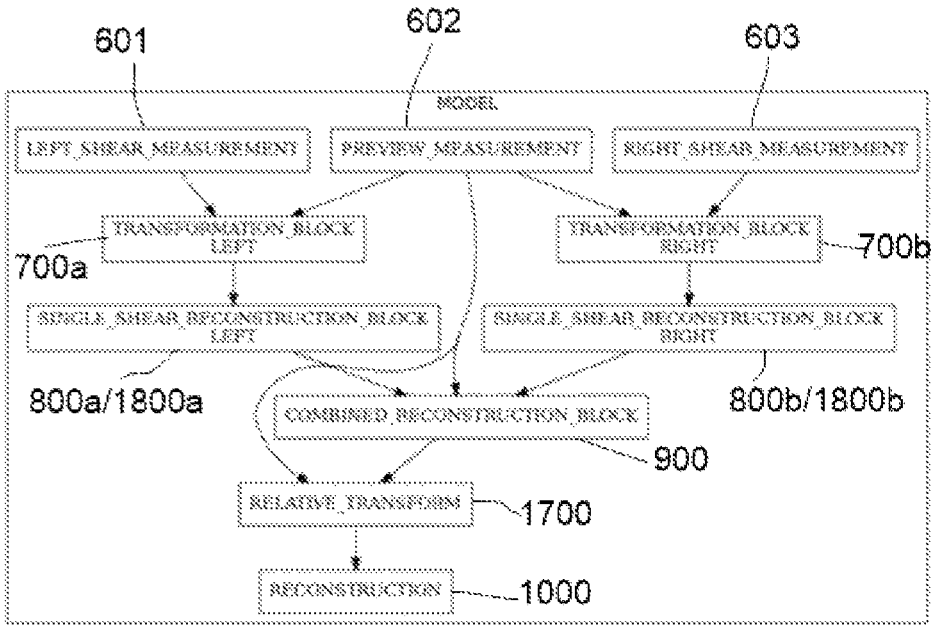
FIG. 11 is a block diagram of a computer implemented method for determining a hyperspectral datacube in another aspect.

FIG. 11 shows an architecture for an embodiment according to another aspect of a machine learning model 600 for reconstructing a hyperspectral datacube using outputs from the hyperspectral imaging devices 100-500.

In the embodiment shown, the model 600 takes a left-shear measurement 601, a preview measurement 602 and a right-shear measurement 603 as inputs. It will be understood that left-shear and right shear are merely convenient labels for the different sheared views, and that the left-shear and right-shear measurements may have the same shear direction but different amounts of shear, or the same shear and a different encoding. It is preferable for the shear direction to be different, and for spatial encoding to be different.

The left-shear measurement 601 corresponds to an output from one of the first and second array detectors 114, 116, whilst the right-shear measurement 603 corresponds to an output from the other of the first and second array detectors 114, 116. The preview measurement 602 corresponds to an output of the third array detector 132 (e.g., a direct image of the scene). The left-shear measurement 601 and the right-shear measurement 603 may not necessarily be obtained from first and second detectors 114, 116 spatially positioned left and right of a central third array detector 132.

Each of the left-shear measurement 601 and the preview measurement 602 are passed to a transformation block 700a. Similarly, each of the right-shear measurement 603 and the preview measurement are passed to a transformation block 700b. The transformation blocks 700a, 700b are configured to determine and apply a transform (e.g., a perspective transform) to correct for view differences between the respective one of the left-shear measurement 601 and right-shear measurement 603, and the preview measurement 602. The measurements described can be captured using mono-chrome and/or filter array imaging systems, including but not exclusively bayered filter camera systems.

The transformation block 700a is now described in more detail.

Figure 7:
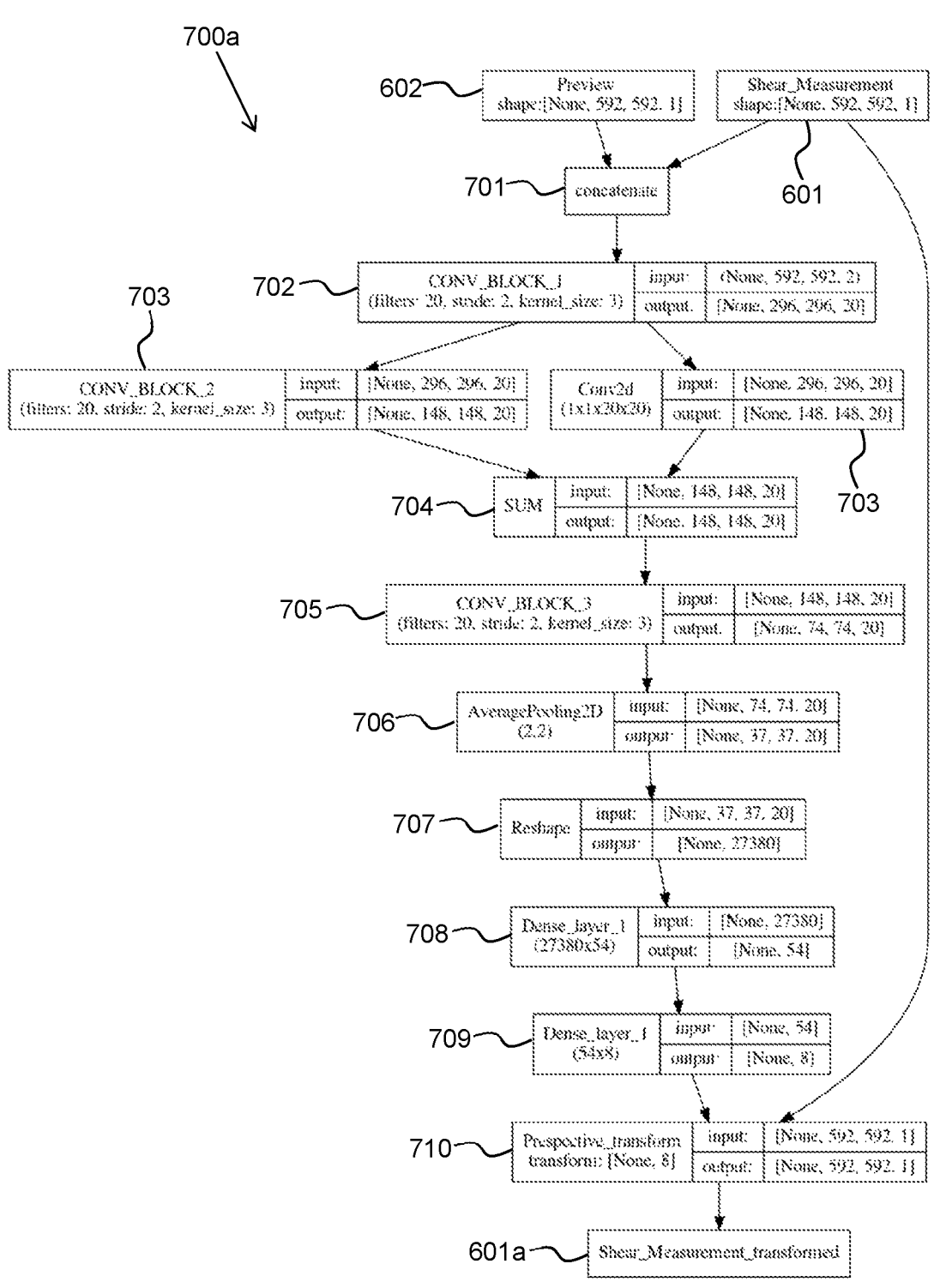
FIG. 7 is a block diagram of a transformation block, for transforming a sheared measurement to account for view differences.

FIG. 7 shows an embodiment of the transformation block 700a. The transformation block 700a comprises a machine learning (ML) algorithm configured to determine the transform to correct for view differences between the left-shear measurement 601 and the preview measurement 602. Conventional analytical and computer vision approaches for correcting for view differences (e.g., view differences due to parallax or misalignment etc.) cannot be applied due to the fact that the left-shear measurement 601 is encoded and dispersed, whilst the preview measurement is a direct image (e.g., unencoded and/or undispersed).

In the embodiment shown, the ML algorithm is a neural network, although other ML algorithms may be used. At step 701, the left-shear measurement 601 and the preview measurement 602 are concatenated. At step 702, a convolution block CONV_BLOCK_1 performs a convolution operation on the concatenated image data. In the embodiment shown, the left-shear measurement 601 and the preview measurement are concatenated by stacking the two images. That is reflected by the input dimensions to CONV_BLOCK_1, which has an input depth of 2.

In the embodiment shown, CONV_BLOCK_1 comprises 20 convolution filters, although any number of filters may be used. Each filter has a stride, enabling CONV_BLOCK_1 to reduce dimensionality of the data (known as down-sampling). In the embodiment shown, each filter has a stride of 2, enabling the filters to reduce dimensionality of the data by a factor of 2. That is reflected by the output spatial dimensions of CONV_BLOCK_1 of 296 pixels by 296 pixels as compared to the input spatial dimensions of 592 pixels by 592 pixels. Alternatively, each filter may have a different stride, enabling the dimensionality of the data to be reduced by a different factor. The output depth of CONV_BLOCK_1 corresponds to the number of filters used (20 filters in the embodiment shown). The filters are used to extract features from the concatenated image data to enable the transform (e.g., perspective transform) to be determined.

Figure 7A:
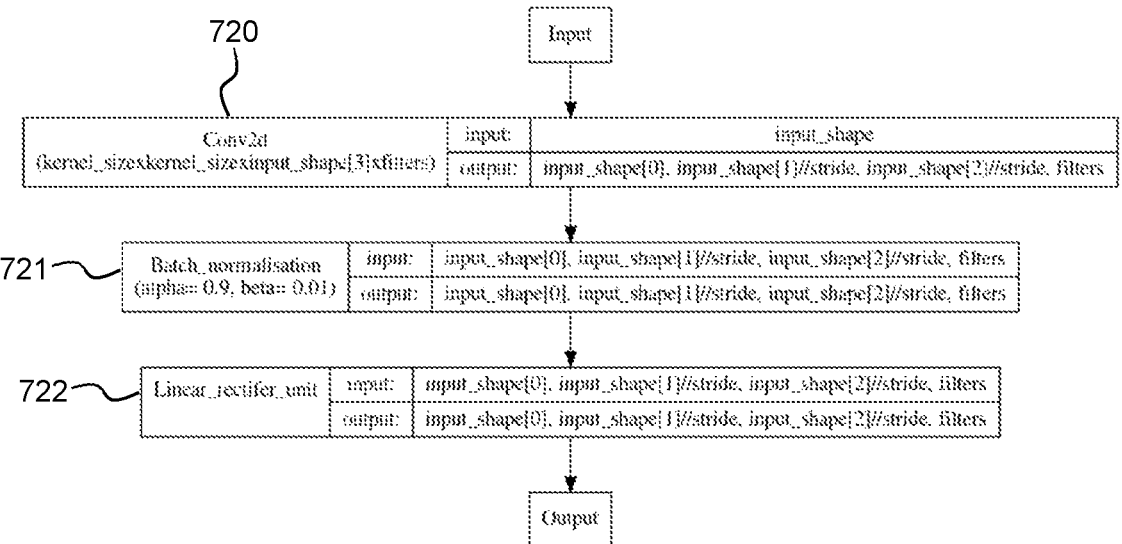
FIG. 7A is a block diagram of a CONV_BLOCK.

The structure and operation of the convolution block CONV_BLOCK_1 is shown in further detail in FIG. 7A. At step 720, a convolution operation is performed using a convolution module Conv2d. The convolution operation comprises stepping a kernel over the input data, moving a stride amount between steps. Each time the kernel steps, a matrix multiplication is performed between the kernel and the input data that the kernel overlaps. The result of that matrix multiplication is summed, and the summed value represents a single 'pixel' in the output data. That process is repeated until the kernel has been moved or stepped over the whole of the input data. Each kernel has three dimensions—planar dimensions corresponding to a height and width of the kernel (e.g., 'kernal_size×kernel_size' in 'kernel_size×kernel_size×input_shape[3]×filters'), and a depth corresponding to a number of stacked layers in the input data (e.g., 'input_shape[3]' in 'kernel_size×kernel_size×input_shape[3]×filters'). A fourth 'dimension' represents the number of different kernels or filters that are stepped across the input data (e.g., 'filters' in 'kernel_size×kernel_size×input_shape[3]×filters'). The number of kernels or filters is equal to the number of stacked layers in the output data of the convolution module Conv2d. For example, if 20 different kernels are stepped across the input data, the output data will comprise 20 stacked layers. Each kernel or filter provides one layer in the stack of layers forming the output data of the convolution module Conv 2d.

The size of the stride amount determines the reduction in dimensionality of the input data achieved by the convolution operation. That can be seen by the output dimensions from the convolution module Conv2d which are 'input_shape[0], input_shape[1]//stride, input_shape[2]//stride, filters'. input_shape[1] and input_shape[2] represent a height and width of the input data. A stride of 2 for the kernels results in a reduction in dimensionality of factor 2 between the input data and output data. The output dimension 'filters' represents the number of stacked layers in the output data, with each of the different filters stepped across the data corresponding to one of the stacked layers.

At step 721, a batch normalisation module Batch_normalisation normalises an output of the convolution module Conv2d (step 720). Conventional batch normalisation may be employed. The parameters 'alpha' and 'beta' shown in FIG. 7A represent the initial values for variance and mean for batch normalisation. The initial values may be updated during training. In the embodiment shown, each layer of the input depth is normalized using batch normalisation, but it will be appreciated that batch normalization may be implemented differently in other embodiments.

At step 722, an activation module Linear_rectifier_unit applies a ReLu (Rectified Linear Unit) activation function to each 'pixel' of the data output by the normalisation module Batch_normalisation (step 721). Using the ReLu activation function, if a pixel value has a value of less than 0, the ReLU function outputs a value of 0 for that pixel. If a pixel value has a value of 0 or more, the ReLu function outputs the value of that pixel. Alternatively, the activation module may employ a different activation function. The ReLu function of the activation module adds non-linearity to the output of the convolution operation. The output of the activation module Linear_rectifier_unit comprises a final output of the convolution block CONV_BLOCK_1.

Returning to FIG. 1, at step 703, the output of CONV_BLOCK_1 (step 702) is passed to a convolution block CONV_BLOCK_2 and to a convolution a Conv2d.

CONV_BLOCK_2 is configured to perform a convolution operation similar to that performed by CONV_BLOCK_1, extracting further features from the data and further reducing the dimensionality of the data. In the embodiment shown, CONV_BLOCK_2 comprises 20 convolution filters each having a stride of 2, reducing the dimensionality of the data by a factor of 2. Each filter may alternatively have a different stride, and/or a different number of filters may be used. Convolution module Conv2d is also configured to perform a convolution operation. The convolution operation performed by Conv2d reduces the dimensionality of the data by the same factor that CONV_BLOCK_2 reduces the dimensionality of the data.

In the embodiment shown, the convolution module Conv2d comprises a convolution module Conv2d, similar to CONV_BLOCK_1, but without the normalisation module Batch_normalisation or the activation module Linear_recti-fier_unit. The output of convolution module Conv2d is neither normalised nor passed through an activation function. The convolution module Conv2d uses a kernel or filter having a height and width of 1 pixel by 1 pixel. The kernel is stepped across the data with a stride of 2. The kernel size of 1 pixel by 1 pixel may enhance computational efficiency. The convolution operation of Conv2d may not be intended to extract features, as with a conventional convolution operation. Rather, the convolution operation of Conv2densures that the output of convolution module CONV_BLOCK_2 and Conv2d are the same size and shape. Alternatively, a pooling operation could be employed in place of the convolution operation of Conv2d. However, a pooling operation does not utilise weights or parameters which can be trained. Reducing the size of the data by using Conv2d to perform a convolution operation provides more weights and parameters which can be trained to improve determination of a transform.

Providing a convolution block CONV_BLOCK_2 having a non-linear output (due to the activation module Linear_rectifier_unit), and a convolution module Conv2d having a linear output, in parallel with one another, provides improved stability and learning of the neural network during backpropagation. If backpropagation and learning through CONV_BLOCK_2 (having a non-linear output) results in either a very high rate of change or no rate of change during learning, then learning can instead backpropagate via Conv2d which has a simpler linear output. The different parallel paths may force a difference between the way the gradients flow over the paths during backpropagation, in turn providing improved stability for backpropagation.

Returning to FIG. 7, at step 704, the outputs of convolution block CONV_BLOCK_2 and convolution module Conv2d (step 703) are summed. At step 705, CONV_BLOCK_3 performs a convolution operation on the summed output of CONV_BLOCK_2 and Conv2d (step 704). CONV_BLOCK_3 is configured to perform a convolution operation similar to that performed by CONV_BLOCK_1 and CONV_BLOCK_2, extracting further features from the data and further reducing the dimensionality of the data. In the embodiment shown, CONV_BLOCK_3 comprises 20 convolution filters each having a stride of 2, reducing the dimensionality of the data by a factor of 2. Each filter may alternatively have a different stride, and/or a different number of filters may be used.

Alternatively, a different number of convolution blocks may be utilised in the transformation block 700a. For example, there may be one, two, four or more convolution blocks in the transformation block 700a.

At step 706, a pooling block AveragePooling2D performs a pooling operation on the output of CONV_BLOCK_3 (step 705). In the embodiment shown, the pooling operation is an average pooling operation. Alternatively, the pooling operation may be a max pooling operation which takes a maximum pixel value from each 2 pixels by 2 pixels region. In the embodiment shown, AveragePooling2D is configured to take an average pixel value from each of a number of 2 pixels by 2 pixels regions in the input data it receives. Alternatively, the pooling block AveragePooling2D may be configured to take an average pixel value from regions have different dimensions, for example 3 pixels by 3 pixels.

At step 707, a data reshaping block Reshape reshapes the output of the AveragePooling2D pooling block (step 706). In the embodiment shown, the reshaping block Reshape is configured to reshape the data by incorporating the value of each pixel in each two-dimensional 37 pixels by 37 pixels image in the 20 image stack (one image for each filter used in the convolution operation of CONV_BLOCK_3) output by AveragePooling2D into a one-dimensional column vector having 27380 values. The exact number of values in the column vector depends on the parameters of the preceding operations (e.g., number of filters in each convolution operation, filter stride etc.).

At step 708, a first densely connected layer Dense_layer_1 is provided. Dense_layer_1 has a number of nodes. In the embodiment shown, Dense_layer_1 has 54 nodes, although a different number of nodes may be used. Each node in Dense_layer_1 is connected to each value in the one-dimensional column vector of the reshaped data (output of step 707). In the embodiment shown, a matrix multiplication is used to connect each node in Dense_layer_1 to each value in the one-dimensional column vector. Weights for the connections between each of the nodes and each of the values determine an output of each of the nodes of Dense_layer_1.

At step 709, a second densely connected layer Dense_layer_2 is provided. Dense_layer_2 has a number of nodes. Each node in Dense_layer_2 is connected to each node in Dense_layer_1. In the embodiment shown, a matrix multiplication is used to connect each node in Dense_layer_2 to each node in Dense_layer_1. Weights for the connections between each of the nodes in Dense_layer_1 and Dense_layer_2 determine an output of each of the nodes of Dense_layer_2. In the embodiment shown, Dense_layer_2 has 8 nodes. The 8 nodes represent 8 values of a 3×3 affine transformation matrix which can be used to perform a transform (e.g., perspective transform) on the left-shear measurement 601. Because the mapping between the left-shear measurement 601 and the preview measurement 602 can be performed using an affine transformation, a ninth value of the transformation matrix is always 1 in the embodiment shown. The ninth value is appended to the 8 node output of Dense_layer_2. Alternatively, one or more intermediate dense layers may be provided between Dense_layer_1 and Dense_layer_2. Alternatively, a single dense layer may be provided to extract the parameters of the transform.

At step 710, the output of Dense_layer_2 is provided to a transformation matrix which is used to perform a transform (e.g., perspective transform) on the left-shear measurement 601. That transformation step provides a transformed left-shear measurement 601a which provides approximated pixel-to-pixel mapping between the left-shear measurement 601 and the preview measurement 602. The left-shear measurement 601 is transformed to be aligned to the geometry of the preview measurement 602. The transformation block 700b operates in a similar manner to determine a transform (e.g., perspective transform) and provide a transformed right-shear measurement 602a to provide approximated pixel-to-pixel mapping between the right-shear measurement 603 and the preview measurement 602. The transformation block 700b may determine a transform (e.g., perspective transform) which is effectively a mirror of the transform (e.g., perspective transform) determined by the transformation block 700a, for example depending on an arrangement of components of the hyperspectral imaging devices 100-500.

In the hyperspectral imaging devices 100-500 described above, multiple views of the same scene are obtained to enable a tomographic reconstruction of a hyperspectral datacube corresponding to the scene. Using multiple views may introduce differences between the views due to, for example, parallax (for multiple aligned parallel views), misalignment (e.g., between the encoder and detector used for each view), manufacturing tolerances and the fact that light must pass through different components to reach each detector. Correcting for those view differences enables improved (e.g., more accurate) hyperspectral datacube reconstruction.

However, directly finding the parameters of a transform (e.g., perspective transform) for correcting for view differences at each detector is particularly challenging for hyperspectral imaging because the light is encoded and dispersed before being detected. The hyperspectral datacubes must be reconstructed to determine the view differences, but the transform(s) is(are) needed to reconstruct the hyperspectral datacubes. Existing compressed sensing and hyperspectral datacube reconstruction methods do not consider parallax, and cannot reconstruct from different views. Compressed sensing reconstruction methods also require perfect knowledge of mask features on the detectors. Furthermore, because one or more of the views is encoded and dispersed, traditional parallax correction techniques (e.g., computer vision parallax correction techniques) cannot be applied. Using a machine learning approach to determine a transform (e.g., perspective transform) for correcting for view differences (e.g., parallax or misalignment etc.) between different views may enable efficient iterative determination of the transform. Using a machine learning approach may also provide enhanced alignment robustness. As noted above, compressed sensing reconstruction methods require perfect prior knowledge of the location of the encoder features on a detector—misalignment between the mask and the sensor can render accurate reconstruction impossible. Using a machine learning approach to determine a transform (e.g., perspective transform), providing mapping to a common view basis for different views to correct for any view differences (e.g., parallax or misalignment etc.), means that prior knowledge of those differences is not required, and view differences are accounted for during the training process to determine the transform. That may enable a hyperspectral datacube to be accurately reconstructed, even in the case where, e.g., an encoder is relayed to a sensor with several pixels of error. The typically expensive and lengthy alignment process required for hyperspectral imagers may not be required in order to accurately reconstruct hyperspectral datacubes. That alignment robustness may also be advantageous for addressing thermal expansion and/or deformation, vibration induced noise and general robustness (e.g., typically hyperspectral imagers cannot be knocked or dropped without destroying alignment).

It will be appreciated that although the transformation block 700*a* is presented as part of a larger system for hyperspectral datacube reconstruction, the transformation block 700*a* may be used independently to correct for view differences between direct (e.g., unencoded and spectrally undispersed) images and encoded and/or spectrally dispersed images, or as part of a different system.

Returning to FIG. 6, the transformed left-shear measurement 601*a* (the output of the transformation block 700*a*) is passed to a left single shear reconstruction block 800*a*. Similarly, the transformed right-shear measurement 602*a* (the output of the transformation block 700*b*) is passed to a right single shear reconstruction block 800*b*. The single shear reconstruction blocks 800*a*, 800*b* are configured to reconstruct a hypercube from the transformed left and right shear measurements 601*a*, 602*a*.

The single shear reconstruction block 800*a* is now described in more detail.

Figure 8:
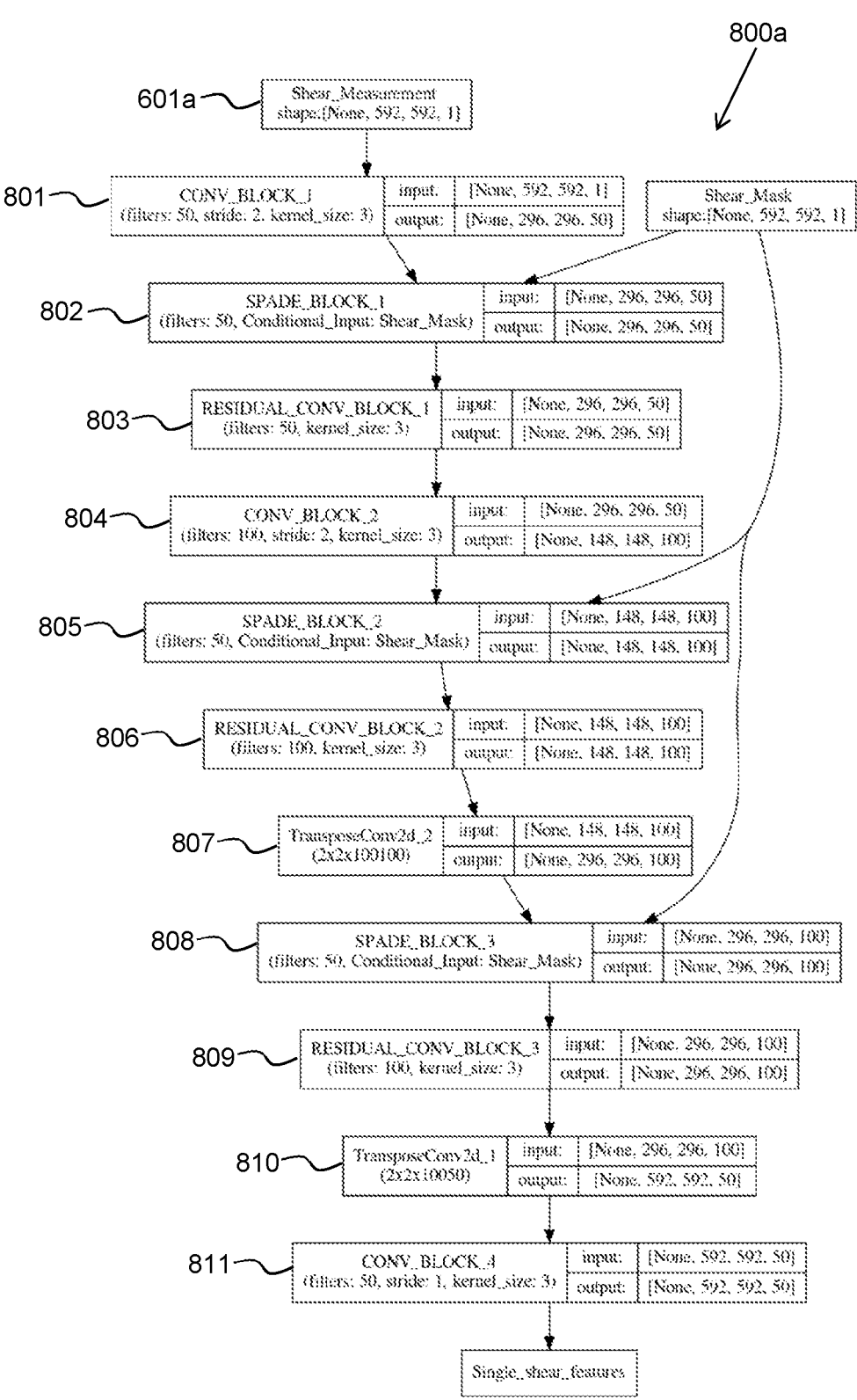
FIG. 8 is a block diagram of a single shear reconstruction block.

FIG. 8 shows an embodiment of the single shear reconstruction block 800*a*. In the embodiment shown, the single shear reconstruction block 800*a* comprises a neural network. The neural network has an encoder-decoder structure, with an encoder portion 800*c* and a decoder portion 800*d*.

At step 801, a convolution block CONV_BLOCK_1 of the encoder portion 800*c* performs a convolution operation on the transformed left-shear measurement 601*a*. CONV_BLOCK_1 of the encoder portion 800*c* is configured to perform a convolution operation similar to that performed by CONV_BLOCK_1, CONV_BLOCK_2 and CONV_BLOCK_3 of the transformation block 700*a* described above. In the embodiment shown, CONV_BLOCK_1 comprises 50 filters, although any suitable number of filters may be used. Each filter has a stride enabling CONV_BLOCK_1 to reduce dimensionality of the data. In the embodiment shown, each filter has a stride of 2, although each filter may have a different stride.

CONV_BLOCK_1 is configured to extract features to aid spectral reconstruction whilst reducing dimensionality of the data (down-sampling). That may enable features having low spatial and spectral frequency to be extracted. Down-sampling may also increase computational efficiency, for example by progressively reducing the amount of spectral and spatial data to be trained and reconstructed.

Figure 8A:
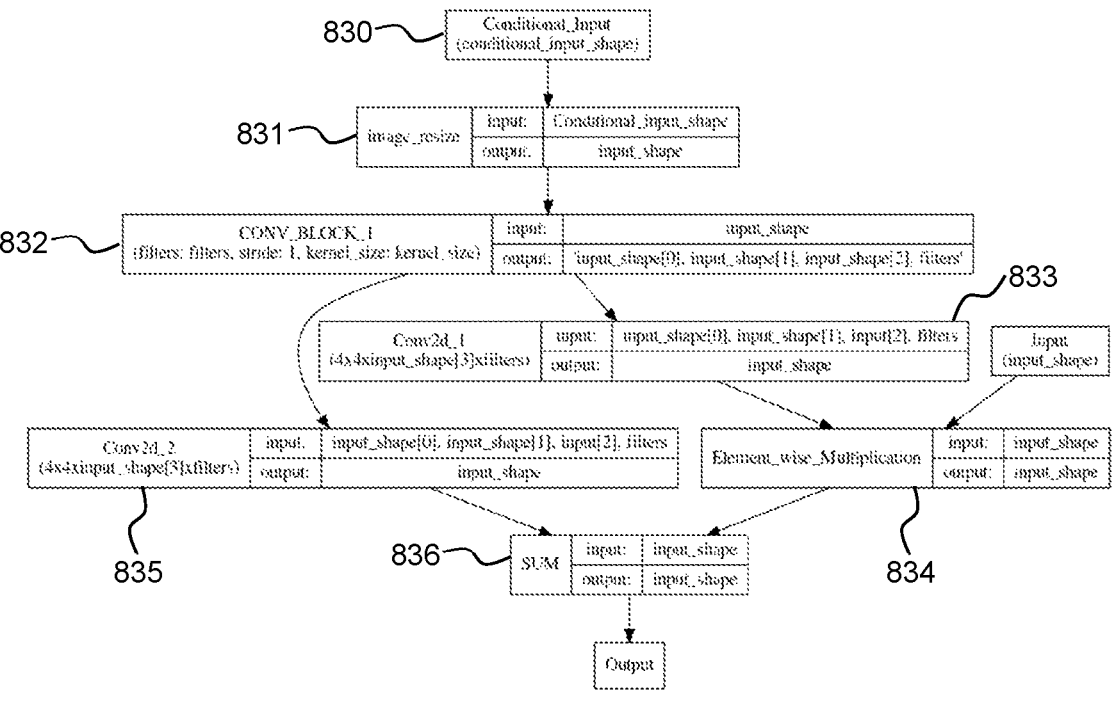
FIG. 8A is block diagram of a SPADE_BLOCK.

At step 802, a SPADE block SPADE_BLOCK_1 performs spatially adaptive normalisation (SPADE) on an output of CONV_BLOCK_1 (step 801). SPADE_BLOCK_1 is configured to apply the features of the mask used to encode the image of the left-shear measurement 601 onto the output of CONV_BLOCK_1. The construction and operation of SPADE_BLOCK_1 is shown in more detail in FIG. 8A.

At step 830, the mask used to originally encode the image of the left-shear measurement 601 is provided as a conditional input to SPADE_BLOCK_1. At step 831, if necessary, the mask code is resized to match the dimensions of the output of the preceding convolution block CONV_BLOCK_1 of the encoder portion 800*c* (step 801).

At step 832, a convolution block CONV_BLOCK_1 of SPADE_BLOCK_1 performs a convolution operation on the (resized) mask, including normalisation and activation steps (similar to step 720-722 described above). In the embodiment shown in FIG. 8, SPADE_BLOCK_1 of the encoder portion 800*c* comprises 50 filters. The convolution operation of CONV_BLOCK_1 of SPADE_BLOCK_1 does not reduce a dimensionality (height and width) of the resized conditional input data. CONV_BLOCK_1 of SPADE_BLOCK_1 creates a stack of output images corresponding to the number of filters used.

At step 833, a convolution module Conv2d_1 performs a convolution operation on an output of CONV_BLOCK_1 of SPADE_BLOCK_1 (step 832), similar to that performed by convolution module Conv2d of the transformation block 700*a* described above (step 703). Normalisation and activation steps are not performed. In the embodiment shown in FIG. 8, Conv2d_1 of SPADE_BLOCK_1 comprises 50 filters.

At step 834, an element wise multiplication is performed between the output of the Conv2d_1 (step 833) and the output of the preceding CONV_BLOCK_1 of the encoder portion 800*c* (step 801).

At step 835, a convolution module Conv2d_2 performs a convolution operation an output of CONV_BLOCK_1 of SPADE_BLOCK_1 (step 832). The convolution operation performed by Conv2d_2 is similar to the convolution operation performed by Conv2d_1 (step 833).

At step 836, an output of Conv2d_2 (step 835) and an output of the element-wise multiplication (step 834) are summed. The summed output of step 836 forms the final output of SPADE_BLOCK_1 of the encoder portion 800*c*. The final output of SPADE_BLOCK_1 has the same output dimensions as the output dimensions of CONV_BLOCK_1 of the encoder portion 800*c* (step 801).

Spatially adaptive normalisation (SPADE) performed by SPADE_BLOCK_1 of the encoder portion applies the mask used to encode the image of the left-shear measurement 601 onto the features extracted from the left-shear measurement

601 by CONV_BLOCK_1 of the encoder portion 800*c*. SPADE forces the neural network to utilise mask information and may therefore exploit the compression which the mask provides. The enforcement of the mask is achieved via a scaling and bias approach, which comprises taking two inputs—an 'original' input and a 'conditional' input. The 'original' input is the output of the preceding convolution block in the encoder portion 800*c* (e.g., step 801). The 'conditional' input is the mask (resized as appropriate to match dimensions of the 'original' input).

The first convolution operation of SPADE_BLOCK_1 performed by CONV_BLOCK_1 extracts features from the 'conditional' input. The second set of convolution operations of SPADE_BLOCK_1 performed by Conv2d_1 and Conv2d_2 create a 'scale' and a 'bias' from those extracted features.

The 'scale' provided by the element-wise multiplication at step 834 forces a weighting between the mask and features extracted via the convolution operation at step 801 to be normalised. The 'bias' provided by the summing at step 836 enforces that the mask is adequately represented when compared to the features being masked.

The SPADE block may be uniquely effective in a context where a signal is masked and then dispersed before being detected (as left-shear measurement 601). Normalising and biasing an encoding mask may enable the mask information to be better exploited in the reconstruction of a hyperspectral datacube. However, the SPADE block is not essential and other approaches may be used in some embodiments.

At step 803, a residual convolution block RESIDUAL_CONV_BLOCK_1 performs a residual convolution operation on an output of SPADE_BLOCK_1 (step 802).

Figure 8B:
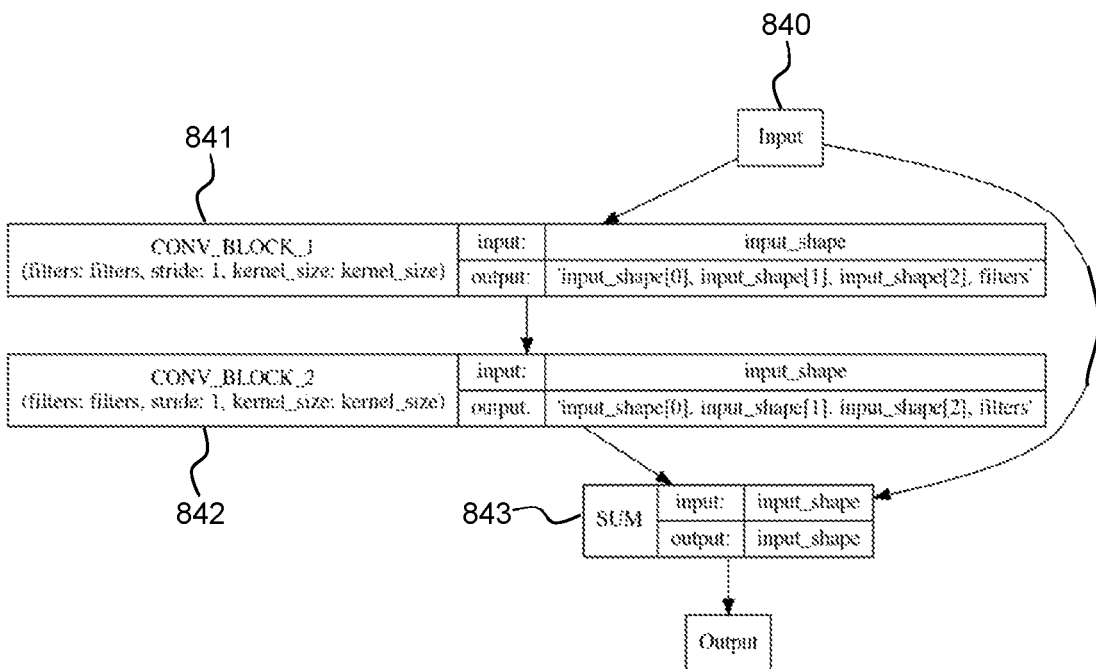
FIG. 8B is a block diagram of a RESIDUAL_CONV_BLOCK.

The construction and operation of RESIDUAL_CONV_BLOCK_1 is shown in more detail in FIG. 8B.

At step 840, an input is provided to RESIDUAL_CONV_BLOCK_1. In the embodiment shown, the input comprises an output of SPADE_BLOCK_1 (step 802).

At step 841, a convolution block CONV_BLOCK_1 of RESIDUAL_CONV_BLOCK_1 performs a convolution operation on the input (step 840), including normalisation and activation steps (similar to steps 720-722 described above). In the embodiment shown in FIG. 8, RESIDUAL_CONV_BLOCK_1 of the encoder portion 800*c* comprises 50 filters. The convolution operation of CONV_BLOCK_1 of RESIDUAL_CONV_BLOCK_1 does not reduce a dimensionality (height and width) of the input data. CONV_BLOCK_1 of RESIDUAL_CONV_BLOCK_1 creates an output data volume with depth equal to the number of filters used.

At step 842, a convolution block CONV_BLOCK_2 of RESIDUAL_CONV_BLOCK_1 performs a convolution operation on the output of CONV_BLOCK_1 of RESIDUAL_CONV_BLOCK_1 (step 841), including normalisation and activation steps (similar to steps 720-722 described above). The convolution operation of CONV_BLOCK_2 of RESIDUAL_CONV_BLOCK_1 does not reduce a dimensionality (height and width) of the data.

At step 843, an output of CONV_BLOCK_2 (step 842) and the input (step 840) are summed. The summed output of step 843 provides a final output of RESIDUAL_CONV_BLOCK_1. The final output of RESIDUAL_CONV_BLOCK_1 has the same output dimensions as the output dimensions of CONV_BLOCK_1 and SPADE_BLOCK_1 of the encoder portion 800*c* (step 801).

The residual convolution block RESIDUAL_CONV_BLOCK_1 is configured to enhance the features extracted by CONV_BLOCK_1 of the encoder portion 800*c*. The residual convolution block RESIDUAL_CONV_BLOCK_1 comprises a stack of convolution blocks with a connection (in the embodiment shown, a summation) between the input of the residual convolution block and the output of the final convolution block in the residual convolution block. The stack allows the neural network to extract features that are relative to the results of the convolution block CONV_BLOCK_1 preceding the residual convolution block. That creates non-linearity and complexity in the neural network, allowing the neural network to identify such characteristics in the data. The connection between the input and the output of the residual convolution block aids model learning via backpropagation. However, the residual convolution block is not essential and a different approach may be used in some embodiments.

Steps 801 to 803 define a series of main blocks of the encoder portion 800*c*, a convolution block, followed by a SPADE block, followed by a residual convolution block. In the embodiment shown, steps 804 to 806 substantially mirror steps 801 to 803. The primary difference is that CONV_BLOCK_2 of the encoder portion 800*c* reduces the dimensionality of the data further by a factor of 2, and comprises 100 filters rather than the 50 filters used by CONV_BLOCK_1 of the encoder portion 800*c*. The series of steps—convolution block, SPADE block, residual convolution block—may be repeated any suitable number of times. However, it will be appreciated that the different blocks need not be used in conjunction with one another, and may be used independent from one another or in a different sub-combination.

At step 807, a transpose convolution block TransposeConv2d_2 of the decoder portion 800*d* performs a transpose convolution operation on the output of RESIDUAL_CONV_BLOCK_2 (step 806). The transpose convolution block is configured to increase dimensionality or resolution of the data (i.e. up-sampling). In the embodiment shown, skip connections are provided between the transpose convolution block TransposeConv2d_2 of the decoder portion 800*d* and the corresponding convolution block CONV_BLOCK_2 of the encoder portion 800*c*. The skip connections enable high spatial frequency information to be transferred to during up-sampling.

At step 808, a SPADE block SPADE_BLOCK_3 performs spatially adaptive normalisation (SPADE) on an output of TransposeConv2d_2 (step 807). Similar to SPADE_BLOCK_1 of the encoder portion, SPADE_BLOCK_3 is configured to ensure that mask information is appropriately utilised.

At step 809, a residual convolution block RESIDUAL_CONV_BLOCK_3 performs a residual convolution operation on an output of SPADE_BLOCK_3 (step 808). The residual convolution block RESIDUAL_CONV_BLOCK_3 of the decoder portion 800*d* performs a similar role to that of the residual convolution block RESIDUAL_CONV_BLOCK_1 of the encoder portion 800*c*.

At step 810, a transpose convolution block TransposeConv2d_1 performs a transpose convolution operation on the output of RESIDUAL_CONV_BLOCK_3 (step 809). In the embodiment shown, TransposeConv2d_1 restores the original resolution and dimensionality of the transformed left-shear measurement 601*a*.

At step 811, a convolution block CONV_BLOCK_4 of the decoder portion 800*d* performs a convolution operation on an output of TransposeConv2d_1 (step 810), including normalisation and activation steps (similar to steps 720-722 described above). In the embodiment shown, the stride of the filters is set at 1, such that the convolution operation does not reduce a dimensionality of the data. The convolution operation at step 811 extracts a set of single shear features 850a for the left-shear measurement 601. Those extracted features represent an initial estimated or attempted reconstruction of a hyperspectral datacube, based on a single shear measurement (left-shear measurement 601). The extracted features are also provided as an input to a combined reconstruction block 900 (described further below), and serve the purpose of passing features to the combined reconstruction block 900 that encode the mask information.

The single shear reconstruction block 800a may create independence between the different sheared views (e.g., the left-shear measurement 601 and the right-shear measurement 603). The single shear reconstruction block 800a may enable the model 600 to use the unique information in each sheared view independently before making use of all of the views in a combined reconstruction. The single shear reconstruction block 800a may enable control over the mask and shearing in each view independently, allowing for hardware faults to be accounted for. In addition, providing a separate single shear reconstruction block for each sheared view may allow extension beyond simple left and right shear measurements, enabling any combination of sheared views to be utilised.

It will be appreciated that although the single shear reconstruction blocks 800a, 800b is presented as part of a larger system for hyperspectral datacube reconstruction, the single shear reconstruction blocks 800a, 800b may each be used independently to reconstruct a hyperspectral datacube from a single sheared view of a scene. The single shear reconstruction blocks 800a, 800b may not require the view (e.g., left or right shear measurement) to be corrected (for example, using the transformation blocks 700a, 700b) before being input to the single shear reconstruction block 800a, 800b. The single shear reconstruction blocks 800a, 800b may also be used as part of a different hyperspectral datacube reconstruction system and method.

In the embodiment of FIG. 8, the single shear reconstruction block 800a, 800b uses spatially adaptive normalisation (SPADE), to apply the mask used to encode the image onto the features extracted by primary convolution operations.

In the alternate embodiment described with reference to FIG. 10A, a single shear reconstruction block 1800a may apply an inverted attention normalisation.

Figure 10A:
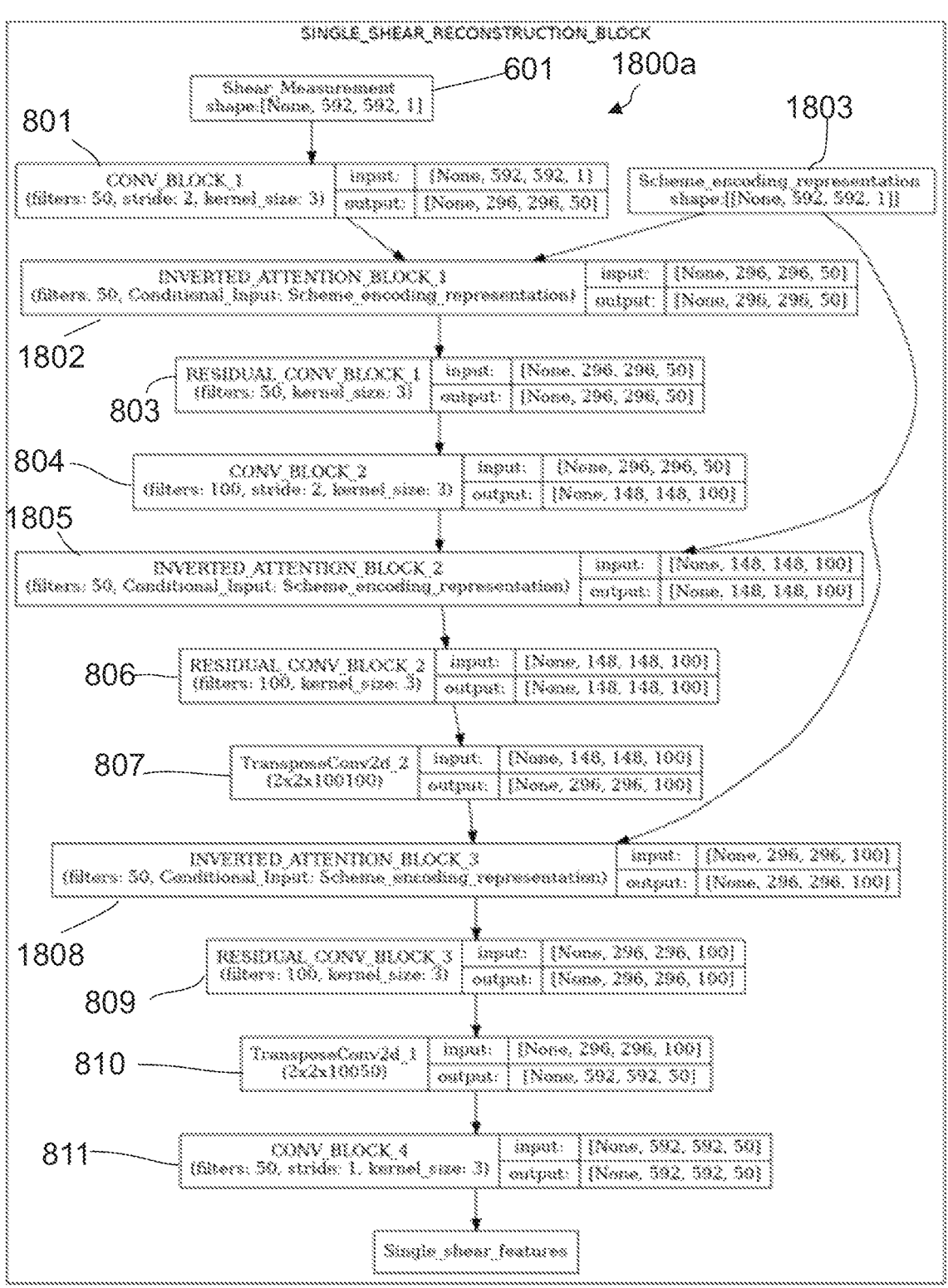
FIG. 10A is a block diagram of a single shear reconstruction block in another aspect using an attention normalisation.

Therefore, the single shear reconstruction block of FIG. 10A mainly differs from the single shear reconstruction block of FIG. 8 in that the step 802 of applying a SPADE_BLOCK 1 is replaced by a step 1802 with an Inverted Attention Normalisation block INVERTED_ATTENTION_BLOCK_1, the step 805 with the SPADE_BLOCK 2 is replaced by a step 1805 with an Inverted Attention Normalisation block INVERTED_ATTENTION_BLOCK_2, and the step 808 with the SPADE_BLOCK 3 is replaced by a step 1808 with an Inverted Attention Normalisation block INVERTED_ATTENTION_BLOCK_3.

At step 1802, a Inverted Attention Normalisation block INVERTED_ATTENTION_BLOCK_1 performs inverted attention normalisation on an output of CONV_BLOCK_1 (step 801). INVERTED_ATTENTION_1 is configured to apply the features of the encoding scheme representation 1803 used to encode the image of the left-shear measurement 601 onto the output of CONV_BLOCK_1.

The encoding scheme representation 1803 is defined as any array which represents or describes the encoding and/or compression of the optical system. This could include masks, a stack of sheared masks or a sensing matrix.

Figure 10B:
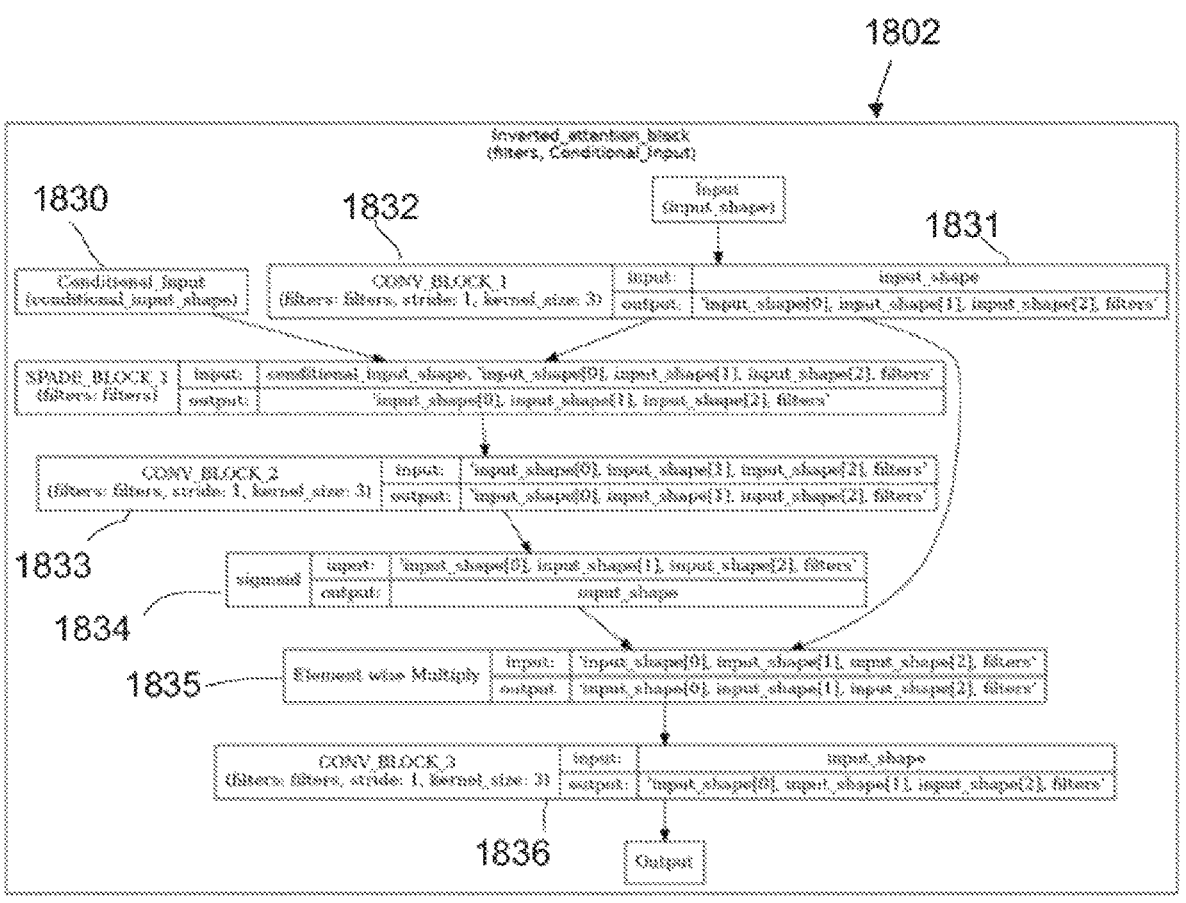
FIG. 10B is a block diagram of an inverted attention block used in the single shear reconstruction block of FIG. 10A.

The construction and operation of INVERTED_ATTENTION_BLOCK_1 is shown in more detail in FIG. 10B. It will be understood that the inverted attention block has the same functionality of the SPADE Block described in reference with FIG. 8A, yet this block is not just a convolutive block but also an attention mechanism to apply the mask more effectively At step 1830, the encoding scheme representation 1803 used to originally encode the image of the left-shear measurement 601 is provided as a conditional input to INVERTED_ATTENTION_BLOCK_1. At step 1831, if necessary, the mask code is resized to match the dimensions of the output of the preceding convolution block CONV_BLOCK_1 of the encoder portion 800c (step 801).

At step 1832, a convolution block CONV_BLOCK_1 of INVERTED_ATTENTION_BLOCK_1 performs a convolution operation on the (resized) mask, including normalisation and activation steps (similar to step 720-722 described above). In the embodiment shown in FIG. 10B, INVERTED_ATTENTION_BLOCK_1 of the encoder portion 800c comprises 50 filters. The convolution operation of CONV_BLOCK_1 of INVERTED_ATTENTION_BLOCK_1 does not reduce a dimensionality (height and width) of the resized conditional input data. CONV_BLOCK_1 of INVERTED_ATTENTION_BLOCK_1 creates a stack of output images corresponding to the number of filters used.

At step 1833, a convolution module Conv2d_1 performs a convolution operation on an output of CONV_BLOCK_1 of INVERTED_ATTENTION_BLOCK_1 (step 832), similar to that performed by convolution module Conv2d of the transformation block 700a described above (step 703). Normalisation and activation steps are not performed. In the embodiment shown in FIG. 10B, Conv2d_1 of INVERTED_ATTENTION_1 comprises 50 filters.

At step 1834, a sigmoid operation is performed on the output of convolution block 2, and at step 1835, an element wise multiplication is performed between the output of the sigmoid operation (step 1834) and the output of the preceding CONV_BLOCK_1 of the encoder portion 800c (step 801).

At step 1836, a convolution module Conv3d_performs a convolution operation an output of the element-wise multiplication CONV_BLOCK_1 of INVERTED_ATTENTION_BLOCK_1 (step 1832). The convolution operation performed by Conv2d_2 is similar to the convolution operation performed by Conv2d_1 (step 833).

At step 1836, an output of Conv2d_2 (step 835) and an output of the element-wise multiplication (step 834) are summed. The summed output of step 836 forms the final output of INVERTED_ATTENTION_BLOCK_1 of the encoder portion 800c. The final output of INVERTED_ATTENTION_BLOCK_1 has the same output dimensions as the output dimensions of CONV_BLOCK_1 of the encoder portion 800c (step 801). Inverted attention normalisation performed by INVERTED_ATTENTION_BLOCK_1 of the encoder portion applies the encoding representation of the left-shear measurement 601 onto the features extracted from the left-shear measurement 601 by CONV_BLOCK_1 of the encoder portion 800c. Inverted attention normalisation forces the neural network to utilise encoding scheme representation information and may therefore exploit the compression which the mask provides. The enforcement of the encoding scheme representation is achieved via a scaling
and bias approach, which comprises taking two inputs—an
'original' input and a 'conditional' input. The 'original' input
is the output of the preceding convolution block in the
encoder portion 800c (e.g., step 801). The 'conditional' input
is the encoding scheme representation (resized as appropri-
ate to match dimensions of the 'original' input).

The first convolution operation of INVERTED_ATTEN-
TION_BLOCK_1 performed by CONV_BLOCK_0
extracts features from the input. The second set of operations
in INVERTED_ATTENTION_BLOCK_1 are performed by
SPADE_BLOCK_1. This receives the conditional input and
the result of CONV_BLOCK_1 and is responsible for
enforcing the conditional input in this case the scheme
encoding representation on to the features extract by
CONV_BLOCK_1.

Description of the SPADE block 1 can be found below.
Following SPADE_BLOCK_1 a convolution operation is
performed on the result of the spade block by
CONV_BLOCK_1 which conditions the features returned
by the spade block allowing the final set of operations to be
applied. Following this a sigmoid activation function as
shown below is applied to the result of CONV_BLOCK_1,
after which it is elementwise multiplied with the result of
CONV_BLOCK_1.

$$f(x) = \frac{1}{1 + e^{(-x)}}$$

The key contributions in this inverted attention block
come from the sigmoid and element wise multiplication
operators which combine to create a local self-attention
mechanism. Which more efficiently applies the results of the
Spatially adaptive normalisation on the input features. This
method is effective because it attempts to redistribute and
attend (highlight) feature information already present in the
input features, rather than create a new feature set.

The integration of local attention in this way is novel, and
there is no prior art in the use of this mechanism in SPADE
based conditioning. The inverted attention block is effec-
tively an enhancement of the SPADE block of FIG. 8. The
incorporation of the Inverted attention block resulted in a 1.2
psnr improvement.

The first convolution operation of SPADE_BLOCK_1
performed by CONV_BLOCK_extracts features from the
'conditional' input. The second set of convolution operations
of SPADE_BLOCK_1 performed by Conv2d_1 and
Conv2d_2 create a 'scale' and a 'bias' from those extracted
features. The 'scale' provided by the element-wise multipli-
cation at step 1834 forces a weighting between the mask and
features extracted via the convolution operation at step 801
to be normalised. The 'bias' provided by the summing at step
1836 enforces that the mask is adequately represented when
compared to the features being masked.

The Inverted attention normalisation block may be
uniquely effective in a context where a signal is masked and
then dispersed before being detected (as left-shear measure-
ment 601). Normalising and biasing an encoding of the
encoding scheme representation may enable the scheme
encoding information to be better exploited in the recon-
struction of a hyperspectral datacube. However, the Inverted
attention normalisation block is not essential and other
approaches may be used in some embodiments.

Conv block 1 is the first operator to act and is performed
on the input features, then the output of those features is passed to the spade block, which acts as described previ-
ously. They are both key contributors with the spade block
enforcing the conditional input and the inverted attention,
with the sigmoid and element wise multiplication projects
the conditioned feature which are outputted by spade block
on to the features resulting from the conv block 1.

Steps 801, 802 and 803 in FIG. 8, respectively steps 801,
1802, and 803 in FIG. 10A define a series of main blocks of
the encoder portion 800c, a convolution block, followed by
a SPADE block, respectively an Inverted attention normali-
sation block, followed by a residual convolution block. In
the embodiment shown, steps 804 to 806 substantially
mirror steps 801 to 803 in FIG. 8, respectively steps 804,
1805, and 806 in FIG. 10A substantially mirror steps 801,
180, 803. The primary difference is that CONV_BLOCK_2
of the encoder portion 800c reduces the dimensionality of
the data further by a factor of 2, and comprises 100 filters
rather than the 50 filters used by CONV_BLOCK_1 of the
encoder portion 800c.

The series of steps—convolution block, SPADE or
Inverted attention normalisation block, residual convolution
block—may be repeated any suitable number of times.
However, it will be appreciated that the different blocks need
not be used in conjunction with one another, and may be
used independent from one another or in a different sub-
combination.

The single shear reconstruction block 800a, 1800a may
create independence between the different sheared views
(e.g., the left-shear measurement 601 and the right-shear
measurement 603). The single shear reconstruction block
800a, 1800a may enable the model 600 to use the unique
information in each sheared view independently before
making use of all of the views in a combined reconstruction.
The single shear reconstruction block 800a, 1800a may
enable control over the mask and shearing in each view
independently, allowing for hardware faults to be accounted
for. In addition, providing a separate single shear recon-
struction block for each sheared view may allow extension
beyond simple left and right shear measurements, enabling
any combination of sheared views to be utilised.

It will be appreciated that although the single shear
reconstruction blocks 800a, 800b, 1800a, 1800b is presented
as part of a larger system for hyperspectral datacube recon-
struction, the single shear reconstruction blocks 800a, 800b
may each be used independently to reconstruct a hyperspec-
tral datacube from a single sheared view of a scene. The
single shear reconstruction blocks 800a, 800b, 800a, 800b,
1800a, 1800b may not require the view (e.g., left or right
shear measurement) to be corrected (for example, using the
transformation blocks 700a, 700b) before being input to the
single shear reconstruction block 800a, 800b. The single
shear reconstruction blocks 800a, 800b may also be used as
part of a different hyperspectral datacube reconstruction
system and method.

Returning to FIG. 6, the outputs of the respective left and
right single shear reconstruction blocks 800a, 800b are
provided as inputs to a combined reconstruction block 900,
together with the preview measurement 602. The combined
reconstruction block 900 is configured to reconstruct an
enhanced hyperspectral datacube from those inputs.

The combined reconstruction block 900 is now described
in more detail.

Figure 9A:
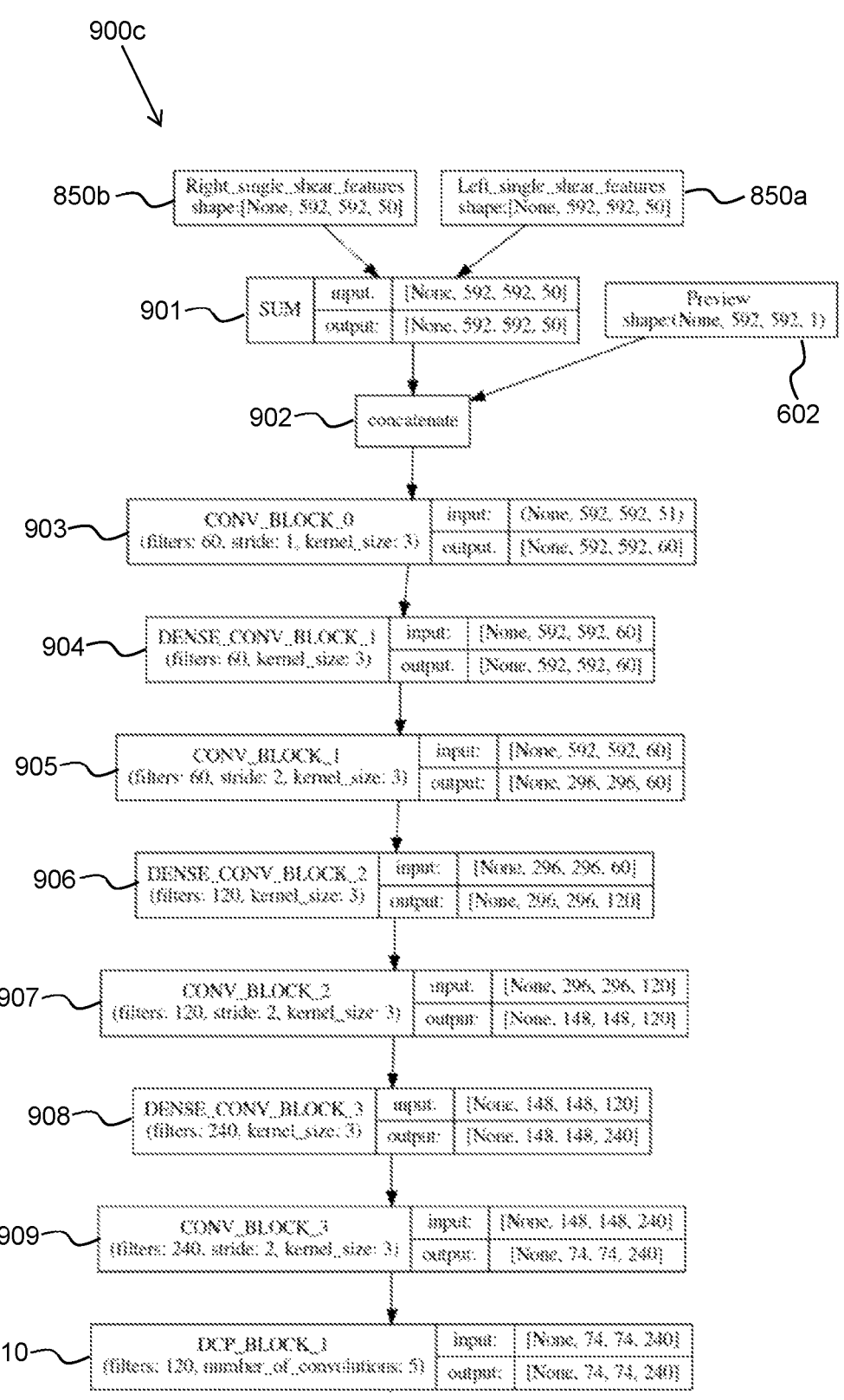
FIGS. 9A and 9B show a block diagram of a combined reconstruction block, for determining a final hyperspectral datacube from at least one estimated hyperspectral datacube and a preview image.
Figure 9B:
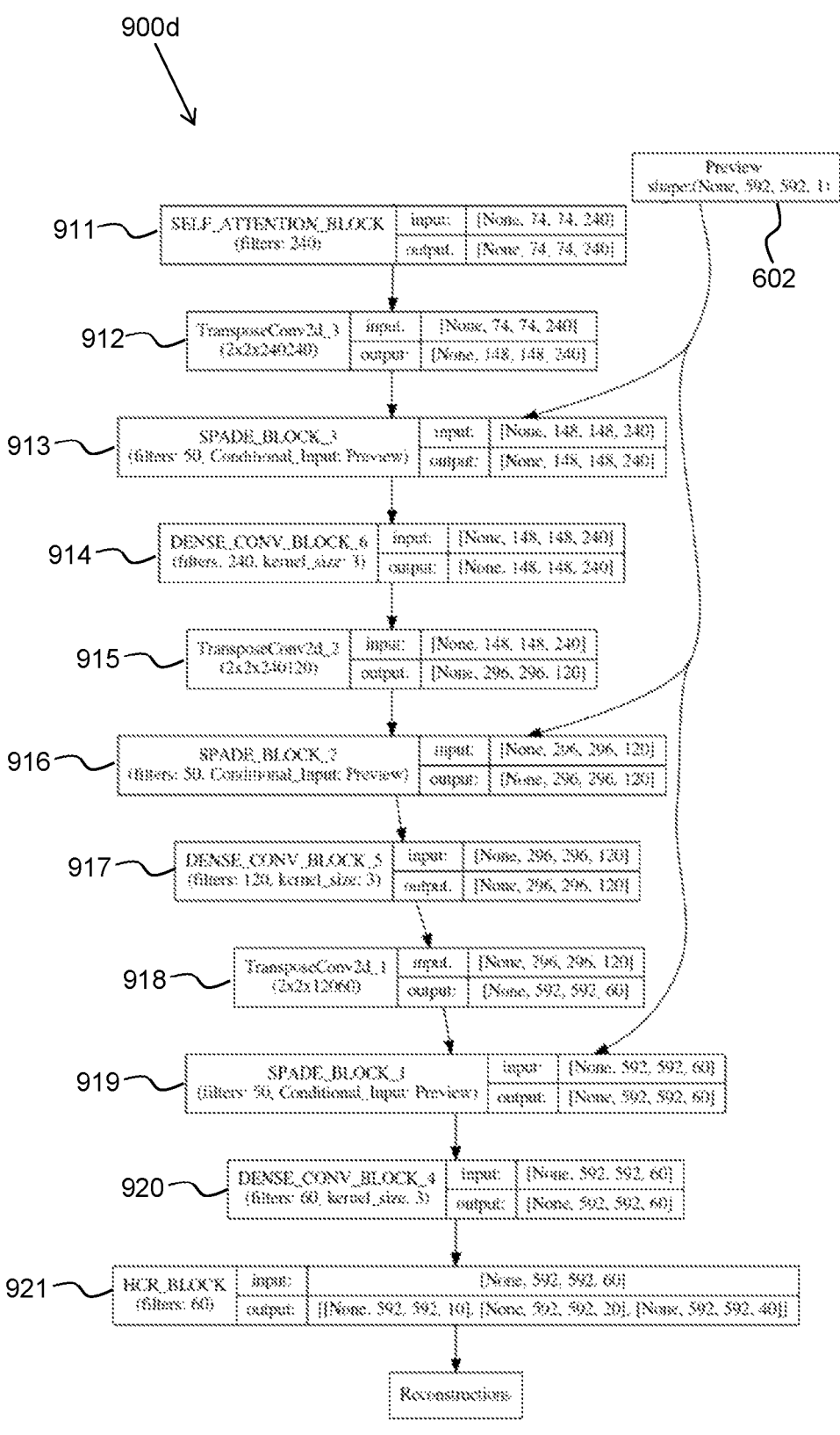

FIGS. 9A and 9B show an embodiment of the combined
reconstruction block 900. In the embodiment shown, the
combined reconstruction block 900 comprises a neural net-
work. The neural network has an encoder-decoder structure,
with an encoder portion 900c and a decoder portion 900d

(similar to the structure of the neural network shown in the single shear reconstruction blocks 800a, 800b). The encoder portion 900c is shown in FIG. 9A, whilst the decoder portion is shown in FIG. 9B.

Turning to FIG. 9A showing the encoder portion 900c, at step 901, the outputs 850a, 850b of the single shear reconstruction blocks 800a, 800b are summed. At step 902, the summed output of step 901 is concatenated with the preview measurement 602. In the embodiment shown, the summed output of step 901 and the preview measurement 602 are concatenated by stacking the two together. That is reflected by the input dimensions to CONV_BLOCK_0 at step 903, which has an input depth of 51.

At step 903, a convolution block CONV_BLOCK_0 of the encoder portion 900c performs a convolution operation on the concatenated output of step 902. CONV_BLOCK_0 of the encoder portion 900c is configured to perform a convolution operation similar to that described in steps 720-722 above. In the embodiment shown, CONV_BLOCK_0 comprises 60 filters, although any suitable number of filters may be used. Each filter has a stride of 1. CONV_BLOCK_0 does not reduce a dimensionality (height and width) of the data.

At step 904, a dense convolution block DENSE_CONV_BLOCK_1 performs a dense convolution operation on the output of CONV_BLOCK_0 (step 903).

Figure 9C:
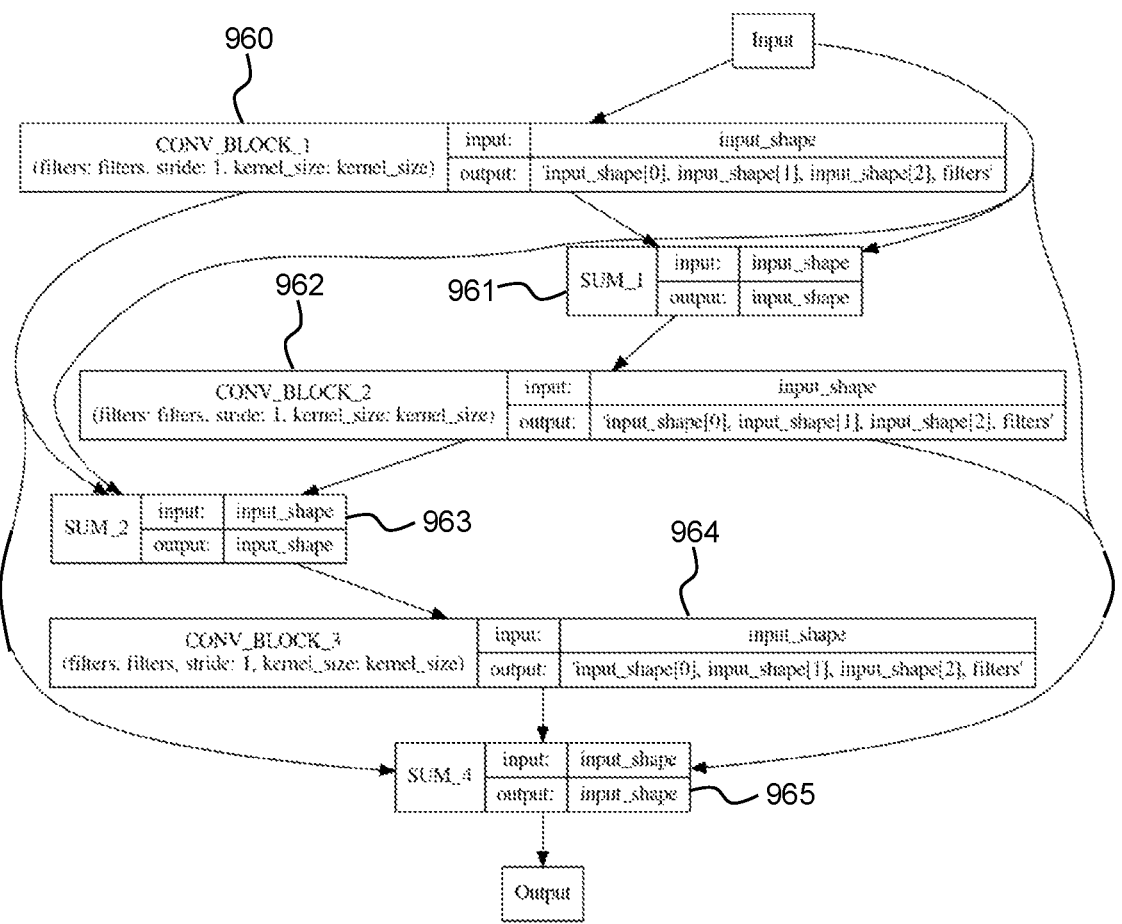
FIG. 9C shows a block diagram of a DENSE_CONV_BLOCK.

The construction and operation of DENSE_CONV_BLOCK_1 is shown in more detail in FIG. 9C.

At step 960, a convolution block CONV_BLOCK_1 of DENSE_CONV_BLOCK_1 performs a convolution operation on the output of CONV_BLOCK_1 of the encoder portion 900c (step 903). The convolution operation does not reduce a dimensionality or resolution of the data. In the embodiment shown in FIG. 9A, DENSE_CONV_BLOCK_1 comprises 60 filters, each having a stride of 1. The output of CONV_BLOCK_1 of DENSE_CONV_BLOCK_1 is a stack of layers, each layer corresponding to a different filter. The number of filters used in DENSE_CONV_BLOCK_1 is the same as the number of filters used in the preceding CONV_BLOCK_1 of the encoder portion 900c, to ensure the data has the same dimensions.

At step 961, the output of step 903 is summed with the output of step 960.

At step 962, a convolution block CONV_BLOCK_2 of DENSE_CONV_BLOCK_1 performs a convolution operation on the summed output of step 961. Similar to step 960, CONV_BLOCK_2 does not reduce a dimensionality or resolution of the data. The number of filters used is the same as the number of filters used in the preceding CONV_BLOCK_0 of the encoder portion 900c.

At step 963, the output of CONV_BLOCK_2 (step 962), the output of CONV_BLOCK_1 (step 960) and the output of the preceding CONV_BLOCK_0 of the encoder portion 900c are summed together.

At step 964, a convolution block CONV_BLOCK_3 of DENSE_CONV_BLOCK_1 performs a convolution operation on the summed output of step 963. Similar to steps 960 and 962, CONV_BLOCK_3 does not reduce a dimensionality of the data. The number of filters used is the same as the number of filters used in the preceding CONV_BLOCK_0 of the encoder portion 900c.

At step 965, the outputs of CONV_BLOCK_3 (step 964), CONV_BLOCK_2 (step 962), CONV_BLOCK_1 (step 960) and the output of the preceding CONV_BLOCK_0 of the encoder portion 900c are summed together. The summed output of step 965 provides the final output of DENSE_CONV_BLOCK_1.

The dense convolution block DENSE_CONV_BLOCK_1 comprises three stacked convolution blocks, although any suitable number (e.g., two, three, four or more) of convolution operations may be performed in the dense convolution block. Connections are provided between an input and an output of each of the stacked convolution blocks, as opposed to only being connected to adjacent blocks (for example, as in conventional convolution blocks). The dense convolution block may assist in stabilising learning. The dense convolution block may alternatively or additionally enable the transfer of higher frequency features from previous, non-adjacent blocks or layers in the neural network to be utilised.

At step 905, a convolution block CONV_BLOCK_1 of the encoder portion 800c performs a convolution operation on the output of DENSE_CONV_BLOCK_1 (step 904). CONV_BLOCK_1 of the encoder portion 800c is configured to perform a convolution operation similar to that performed by CONV_BLOCK_1, CONV_BLOCK_2 and CONV_BLOCK_3 of the transformation block 700a described above. In the embodiment shown, CONV_BLOCK_1 comprises 60 filters, although any number of filters may be used. Each filter has a stride enabling CONV_BLOCK_1 to reduce dimensionality of the data. In the embodiment shown, each filter has a stride of 2, although each filter may have a different stride.

Steps 906 and 908 substantially mirror step 904, whilst steps 907 and 909 substantially mirror step 905. The primary difference is that CONV_BLOCK_2 (step 907) and CONV_BLOCK_3 (step 909) of the encoder portion 900c respectively reduce the dimensionality of the data further by a factor of 2, and respectively comprises 120 and 240 filters rather than the 60 filters used by CONV_BLOCK_1 of the encoder portion 900c. However, it will be appreciated that any suitable number of suitable filters may be used in CONV_BLOCK_2 and CONV_BLOCK_3 of the encoder portion 900c. The filters used in each of CONV_BLOCK_2 and CONV_BLOCK_3 of the encoder portion 900c may also use any suitable stride to reduce a dimensionality of the data accordingly. The series of steps—convolution block, dense convolution block—may be repeated any suitable number of times (e.g., once, twice, three times or more). However, it will be appreciated that the different blocks need not be used in conjunction with one another, and may be used independently from one another. The dense convolution blocks are not essential.

At step 910, a Diluted Convolutional Pyramid (DCP) block DCP_BLOCK_1 of the encoder portion 900c performs at least one dilated convolution operation on the output of CONV_BLOCK_3 (step 909).

Figure 9D:
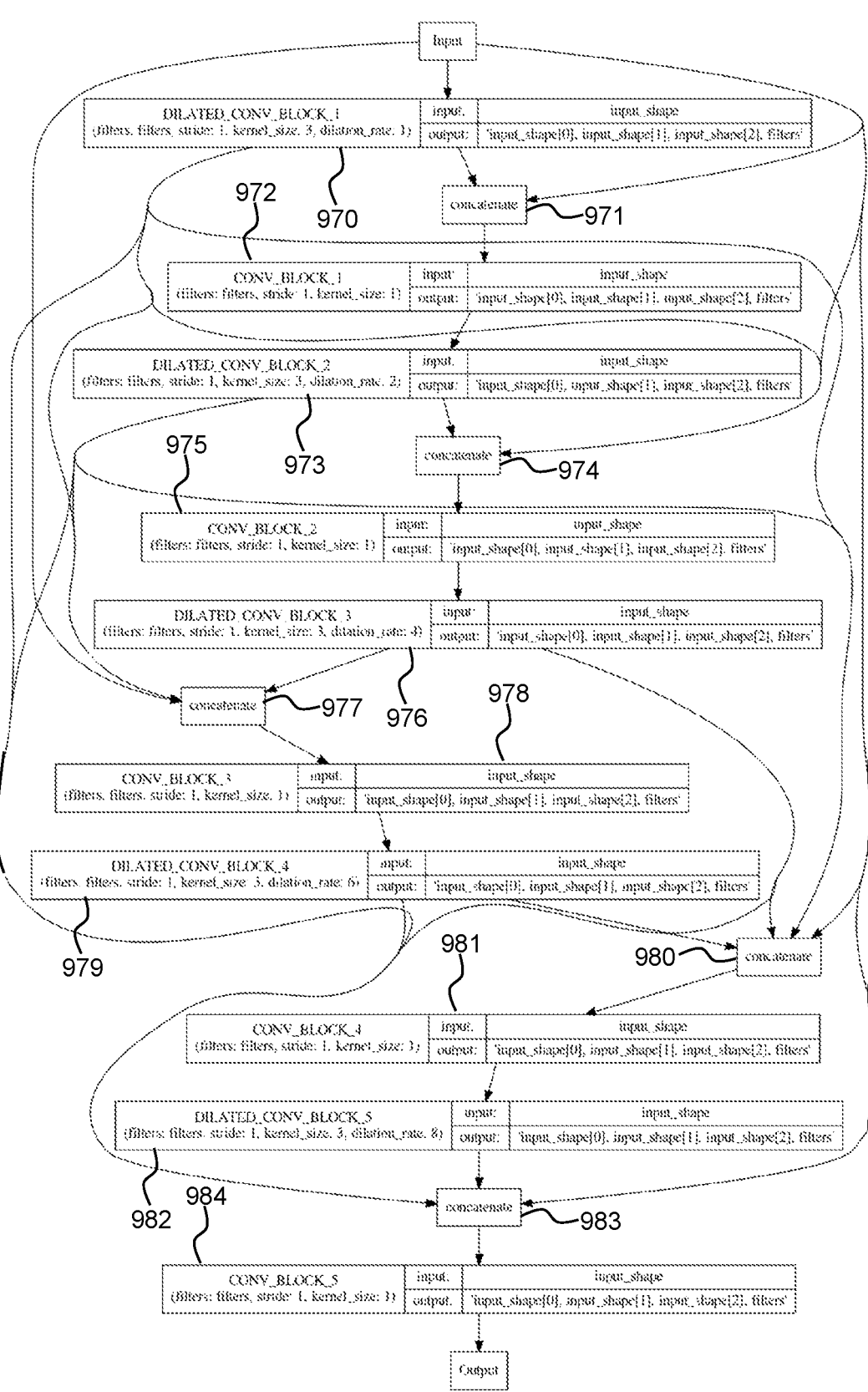
FIG. 9D shows a block diagram of a DCP_BLOCK.

The construction and operation of DCP_BLOCK_1 is shown in more detail in FIG. 9D.

At step 970, a dilated convolution block DILATED_CONV_BLOCK_1 performs a dilated convolution operation (also known as an atrous convolution) on the output of CONV_BLOCK_3 (step 909). The dilation rate of the filter or kernel used in the dilated convolution operation effectively spaces out the kernel by a factor corresponding to the dilation rate. A dilated convolution operation may allow the kernel or filter to operate over a larger receptive field than, for example, a traditional convolution operation. The higher the dilation rate, the larger the receptive field the kernel operates over. In the embodiment shown, the filters used in DILATED_CONV_BLOCK_1 use a dilation rate of 1. A dilation rate of 1 corresponds to a kernel that is not spaced out. No spaces are placed between the elements of the kernel. The kernels of DILATED_CONV_BLOCK_1 therefore act as conventional convolution filters. In the embodiment shown, DILATED_CONV_BLOCK comprises 60 filters, but any suitable number of filters may be used. The filters are stepped across the data with a stride of 1, retaining the dimensionality and resolution of the data (there is no down-sampling).

At step 971, the output of DILATED_CONV_BLOCK_1 is concatenated with the output of CONV_BLOCK_3 (step 909). At step 972, a convolution block CONV_BLOCK_1 of DCP_BLOCK_1 performs a convolution on the concatenated output of step 971. In the embodiment shown, CONV_BLOCK_1 comprises 60 filters, but any suitable number of filters may be used. Each filter is stepped across the data using a stride of 1. CONV_BLOCK_1 is not configured to reduce a dimensionality (height and width) of the data.

At step 973, a dilated convolution block DILATED_CONV_BLOCK_2 performs a dilated convolution operation on the output of CONV_BLOCK_1 of DCP_BLOCK_1 (step 972). The dilated convolution operation performed by DILATED_CONV_BLOCK_2 is similar to that performed by DILATED_CONV_BLOCK_1. The primary difference is that the dilation rate of the filters is increased to 2. A dilation rate of 2 introduces a single space between each element of the filter. For example, a filter of dimensions 3 pixels by 3 pixels having a dilation rate of 2 will have the same receptive field as a filter of dimensions 5 pixels by 5 pixels, but using only 9 filter elements. The filter is stepped across the data with a stride of 1 to retain dimensionality and resolution of the data.

At step 974, the output of DILATED_CONV_BLOCK_2 is concatenated with the output of CONV_BLOCK_3 (step 909) and the output of DILATED_CONV_BLOCK_1 (step 970). In the embodiment shown, the respective outputs are concatenated by stacking the outputs, thereby increasing a depth of the data. At step 975, a convolution block CONV_BLOCK_2 of DCP_BLOCK_1 performs a convolution operation on the concatenated output of step 974. In the embodiment shown, CONV_BLOCK_2 comprises 60 filters, but any suitable number of filters may be used. Each filter is stepped across the data using a stride of 1. CONV_BLOCK_2 is not configured to reduce a dimensionality (height and width) of the data.

In the embodiment shown, steps 976 to 978, 979 to 981, and 982 to 984 substantially mirror steps 970 to 972 and 973 to 975. The primary difference is that the dilation rate for the dilated convolution blocks (steps 976, 979, 982) increases with each successive dilated convolution block. In the embodiment shown, the dilation rates for DILATED_CONV_BLOCK_3, DILATED_CONV_BLOCK_4 and DILATED_CONV_BLOCK_5 respectively are 4, 6 and 8. The dilation rates across the five dilated convolution blocks in the embodiment shown are 1, 2, 4, 6 and 8. However, different increases in dilation rates between successive dilated convolution blocks may be used instead (the increase in dilation rate determining the dilation rate of the next dilated convolution block).

In the embodiment shown, the DCP block comprises a stack of successive dilated convolution blocks. A dilation rate of the filters or kernels used increases with each successive dilated convolution block. That enables the filters to act over an increasingly larger area of the data with each successive dilated convolution operation. By increasing the dilation rate, a kernel can operate over a larger area than a traditional convolution operation using a kernel of the same size. Successive dilated convolution operations with an increasing dilation rate may enable the receptive field of features to be increased, using a more compact neural network than if non-dilated convolutions are used. That may be achieved at substantially the same resolution for non-dilated convolutions. A more compact neural network may improve reconstruction speed. However, the DPC block is not essential.

In the embodiment shown, the dilated convolution blocks are densely connected. The outputs of each of the preceding dilation convolution blocks are provided as an input to the next dilated convolution block. Connections are provided between an input and an output of each of the stacked convolution blocks, as opposed to only being connected to adjacent blocks (for example, as in conventional convolution blocks). The densely connected dilated convolution blocks may assist in stabilising learning. The dense connections in the DCP block may reduce the effects of resolution loss resulting from the stacked dilated convolution blocks having successively increasing dilation rates. The dense connections may allow features captured at a higher kernel resolution to be maintained through the successive dilated convolution operations and form a part of the output of the DCP block. Resolution loss refers to the resolution of the kernel at different dilation rates. At an increased dilation rate, the kernel is more spread out over the input but still has the same number of parameters. Therefore, at a lower dilation rate, higher resolution and higher frequency features are extracted, whereas at a higher dilation rate, more semantic and lower frequency features are extracted. The dense connections enable those different features to be combined.

Turning to FIG. 9B showing the encoder portion 900d, at step 910, the output of DCP_BLOCK_1 (step 909) is passed to a self-attention block SELF_ATTENTION_BLOCK. In the embodiment shown, the self-attention block extracts three feature sets from the output of DCP_BLOCK_1, although any number of feature sets may be extracted. Two of the feature sets are combined, using matrix multiplication, to form an attention map. The attention map is then combined with the third feature set, using element-wise multiplication, to form an attention mapped set of features. The attention map serves to highlight important features in the original input to the self-attention block, which may effectively enable a dense connection from all of the individual features in the input to the self-attention block. That may highlight regions in the global scope of the feature map with important information, to aid in reconstructing the hyperspectral datacube from long-range features. However, the self-attention block is not essential and embodiments are possible without this feature.

At step 911, a transpose convolution block TransposeConv2d_3 performs a transpose convolution operation on the output of SELF_ATTENTION_BLOCK (step 910). The transpose convolution operation is substantially as described above for the decoder portion 800d of the single shear reconstruction block 800a (steps 807, 810). The transpose convolution block is configured to increase dimensionality or resolution of the data (known as up-sampling). Skip connections may be provided between the transpose convolution block TransposeConv2d_2 of the decoder portion 900d and the corresponding convolution block CONV_BLOCK_3 of the encoder portion 900c. The skip connections enable high spatial frequency information to be transferred during up-sampling.

At step 912, a SPADE block SPADE_BLOCK_3 performs spatially adaptive normalisation on the output of TransposeConv2d_3 (step 911). The spatially adaptive normalisation is substantially as described above for SPADE_BLOCK_1 of the single shear reconstruction block 800a

(see step 802). However, rather than the mask or encoder, the preview measurement 602 is used as the 'conditional' input to SPADE_BLOCK_3 of the decoder portion 900d. The SPADE block leverages the information provided by the preview measurement 602. The SPADE block uses the preview measurement 602 information to enhance a spatial resolution of the reconstructed hyperspectral datacube.

At step 913, a dense convolution block DENSE_CONV_BLOCK_6 performs a dense convolution operation on the output of SPADE_BLOCK_3 (step 912). The dense convolution operation is substantially as described above for DENSE_CONV_BLOCK_1 of the encoder portion 900c.

In the embodiment shown, steps 914 to 916 and 917 to 919 substantially mirror steps 911 to 913. The primary difference is that TransposeConv2d_2 and TransposeConv2d_1 respectively increase or restore the dimensionality (e.g., height and width) of the data further by a factor of 2. In the embodiment shown, TransposeConv2d_2 and TransposeConv2d_1 respectively comprise 120 and 60 filters, but any suitable number of filters may be used. The series of steps—transpose convolution block, SPADE block, dense convolution lock—may be repeated any suitable number of times (for example, to mirror the number of down-sampling convolution operations in the encoder portion 900c). However, it will be appreciated that the different blocks need not be used in conjunction with one another, and may be used independently from one another. The SPADE blocks and dense convolution blocks are not essential.

At step 920, a hierarchical reconstruction block (HCR block) HCR_BLOCK performs a hierarchical channel reconstruction of the hyperspectral datacube.

Figure 9E:
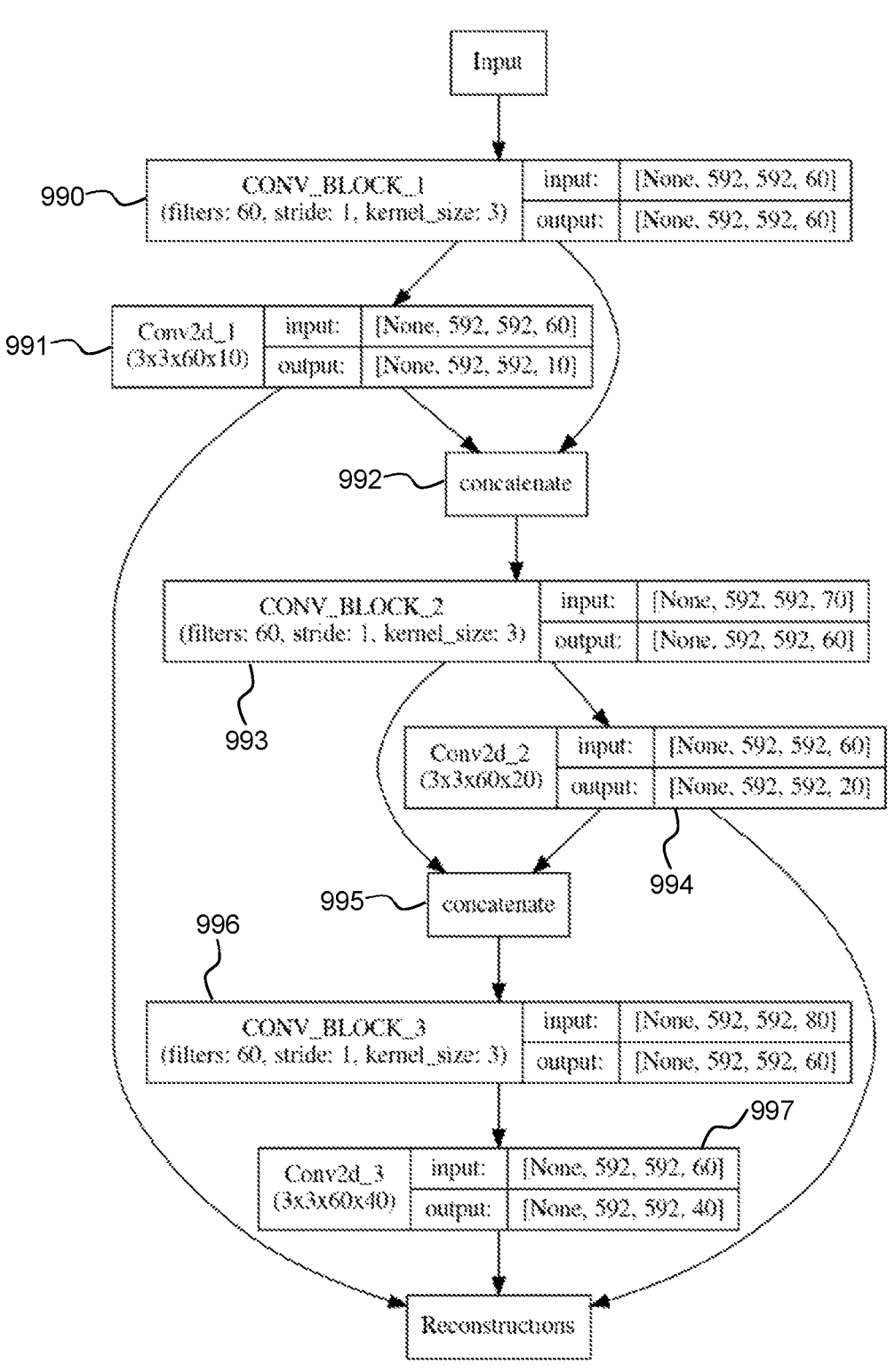
FIG. 9E shows a block diagram of a HCR_BLOCK.

The construction and operation of HCR_BLOCK is shown in more detail in FIG. 9E.

At step 990, a convolution block CONV_BLOCK_1 of HCR_BLOCK performs a convolution operation on the output of DENSE_BLOCK_4 (step 919), including normalisation and activation steps (similar to step 720-722 described above). In the embodiment shown in FIG. 9E, CONV_BLOCK_1 of HCR_BLOCK comprises 60 filters. Each filter is stepped across the data with a stride of 1. The convolution operation of CONV_BLOCK_1 of HCR_BLOCK does not reduce a dimensionality (height and width) of the data. CONV_BLOCK_1 of HCR_BLOCK creates a stack of output images corresponding to the number of filters used.

At step 991, a convolution module Conv2d_1 performs a convolution operation on the output of CONV_BLOCK_1 of HCR_BLOCK (step 990), without any normalisation or activation steps (see step 703). Conv2d_1 comprises 10 filters. Each of the 10 filters corresponds to a spectral channel forming part of the hyperspectral datacube to be reconstructed.

At step 992, the output of CONV_BLOCK_1 and Conv2d_1 are concatenated. The concatenation forms a stack having a depth of 70. At step 993, a convolution block CONV_BLOCK_2 performs a convolution operation on the concatenated output of step 992. In the embodiment shown, CONV_BLOCK_2 comprises 60 filters. Each filter is stepped across the data with a stride of 1. The convolution operation of CONV_BLOCK_2 of HCR_BLOCK does not reduce a dimensionality (height and width) of the data.

At step 994, a convolution module Conv2d_2 performs a convolution operation on the output of CONV_BLOCK_2 of HCR_BLOCK (step 993), without any normalisation or activation steps. Conv2d_2 comprises 20 filters. Each of the 20 filters corresponds to a spectral channel forming part of the hyperspectral datacube to be reconstructed.

At step 995, the output of CONV_BLOCK_2 and Conv2d_2 are concatenated. The concatenation forms a stack having a depth of 80. At step 996, a convolution block CONV_BLOCK_3 performs a convolution operation on the concatenated output of step 995. In the embodiment shown, CONV_BLOCK_3 comprises 60 filters. Each filter is stepped across the data with a stride of 1. The convolution operation of CONV_BLOCK_3 does not reduce a dimensionality (height and width) of the data.

At step 997, a convolution module Conv2d_3 performs a convolution operation on the output of CONV_BLOCK_3 of HCR_BLOCK. In the embodiment shown, Conv2d_3 comprises 40 filters. Each of the 40 filters corresponds to a spectral channel forming part of the hyperspectral datacube to be reconstructed.

The respective outputs of Conv2d_1, Conv2d_2 and Conv2d_3 comprise a 10 channel, 20 channel and 40 channel reconstruction of a hyperspectral datacube corresponding to a scene.

The HCR block is configured to conduct a spectral reconstruction in stages, increasing the number of channels reconstructed at each stage. In the embodiment shown, the HCR block is configured to conduct a reconstruction of a quarter of the total channels in a first stage. The precise number of channels is determined by the number of filters employed by the convolution module used for reconstruction at the first stage. The HCR block is then configured to perform a reconstruction of a next quarter of the total channels in a second stage. Finally, the HCR block is configured to conduct a reconstruction of the total number of channels in a third stage. The reconstructed channels from the first stage are passed to the second stage, to aid channel reconstruction in the second stage. Similarly, the reconstructed channels from the second stage are passed to the third stage, to aid channel reconstruction in the third stage to form the overall reconstructed hyperspectral datacube. The output of the final stage of HCR represents the final reconstructed hyperspectral datacube. The reconstructed channels in the intermediate stages of HCR do not form part of the output reconstructed hyperspectral datacube. However, those intermediate outputs may be used in training the combined reconstruction block 900 (described below).

Figure 12:
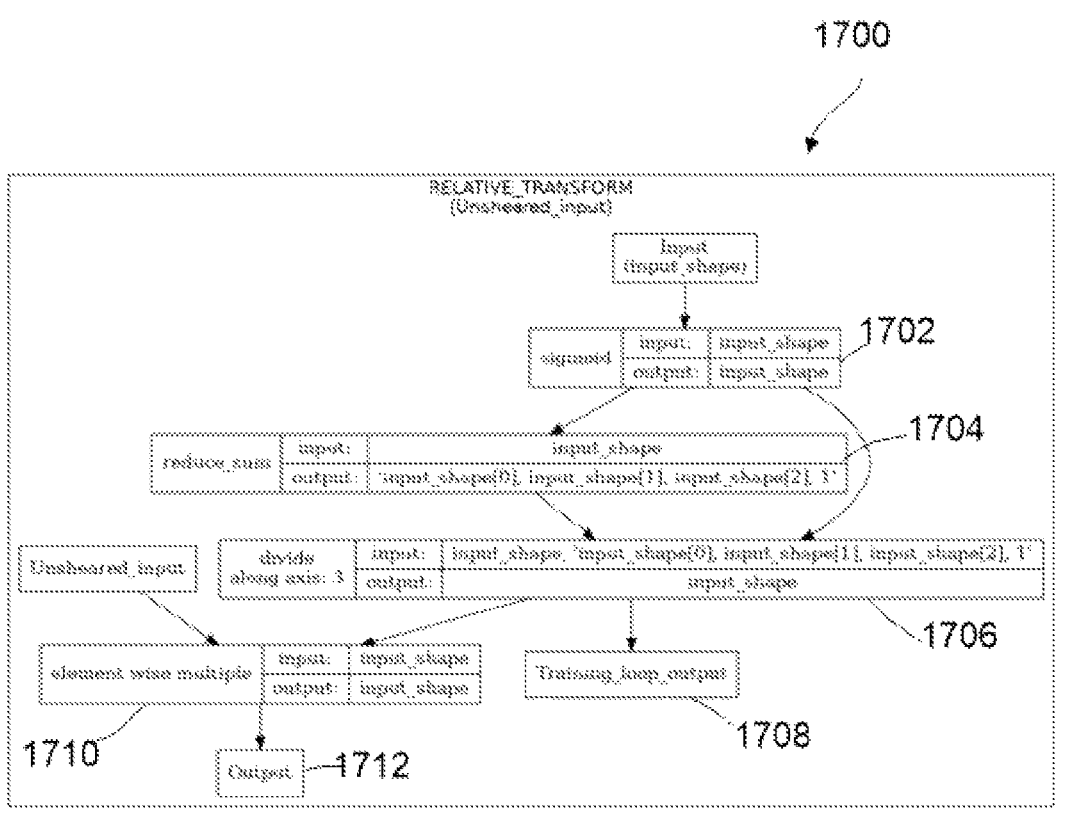
FIG. 12 is a block diagram of a relative transform block which can be used after a combined reconstruction block, for determining a final hyperspectral datacube from at least one estimated hyperspectral datacube and a preview image.

It is possible to add another step, to normalise the resulting reconstructions by the preview. This is shown in FIG. 11, at step 1700. The resulting reconstructions from the HCR block are normalised using a relative normalisation transform as described in FIG. 12. The process starts with a sigmoid operation 1702 being applied to the reconstruction. The output of the sigmoid operation is then collapsed using a reduce_sum operation 1704, where the result is a channel wise sum of the result of the sigmoid operator. The output of the sigmoid operation is then divided through by the output of the reduce_sum operation using a divide operator 1706 running along the third axis of the inputs (described below). The result of the divide operator is defined as the training loop output 1708.

$$r_{i,j,k} = \frac{z_{i,j,k}}{\sum_{k=1}^{n} z_{i,j,k}} \quad (1)$$

Where $$z = \frac{1}{1 + e^{-c}} \quad (2)$$

Where c is a hyperspectral reconstruction attempt.

Additionally, the result of the divide operator 1706 is also elementwise multiplied by the unsheared measurement 1710. In this case the unsheared measurement is defined as the preview measurement to produce normalised output.

This relative transform 1700 return both the defined output 1712 and a training loop 1708 output however only the defined output used in the reconstruction with the training loop output only being utilised in training loop (described later).

The output relative normalisation 1700 transforms results in a reconstruction which is relative to the intensity present in the unsheared measurement. As a result of this the reconstruction is bounded by the total power captured by the detectors. This allows the development of direct intensity relation between the reconstruction and scene being imaged. This allows for valuable intensity information to be preserved during the reconstruction process.

Additionally, the relative transform stabilises and improvements performance in training which will be described in more detail later.

Normalising by the preview results in a reconstruction which is relative to both the preview intensity and spatial information (frequencies) present in the preview.

This method has resulted in a 3.5 psnr improvement.

The output of step 920 (reconstruction block of FIG. 9B), or of the relative transform step 1700 provides an enhanced hyperspectral datacube as the final output of the combined reconstruction block (in the specific example, there are three datacubes, each with different spectral resolution (depth).

Instead of starting from the detected raw data, the combined reconstruction block 900 tomographically reconstructs an enhanced hyperspectral datacube using at least one estimated hyperspectral datacube and a preview measurement. In the example embodiment, there are two estimated hyperspectral datacubes (one from each single shear reconstruction block 800a, 800b) and the preview measurement 602.

The machine learning model 600 therefore employs a two-stage approach to hyperspectral datacube reconstruction. The first stage of the reconstruction comprises correcting for differences between the multiple views and providing an initial estimate for reconstruction of the hyperspectral datacube from each sheared view. The first stage of the reconstruction is performed using the transformation blocks, 700a, 700b and the single shear reconstruction blocks 800a, 800b or 1800a, 1800b. The second stage of the reconstruction comprises combining the estimated hyperspectral datacubes from the first stage, and enhancing the combination to form a final reconstruction of the hyperspectral datacube. The second stage of the reconstruction is performed using the combined reconstruction block 900.

In the machine learning model of FIG. 11, the first stage of the reconstruction is performed using the transformation blocks 700a, 700b and the single shear reconstruction blocks 800a, 800b, or 1800a, 1800b. The second stage of the reconstruction is performed using the combined reconstruction block 900 and relative transform block 1700.

Performing a two-stage reconstruction within a single model 600 dramatically increases a speed of hyperspectral datacube reconstruction. The two-stage approach also separates the final reconstruction from the multiple individual views (and any noise or perturbations in those views, for example differences resulting from parallax, misalignment or manufacturing tolerances). For example, for a hyperspectral datacube having dimensions of 512 pixels by 512 pixels by 40 pixels, a conventional compressed sensing reconstruction takes longer than 20 seconds.

The machine learning model 600 described above takes less than 0.1 seconds to reconstruct a hyperspectral datacube having those dimensions (performed on NVIDIA RTX 2080). That reduction in reconstruction time may allow for 'live' viewing of reconstructed hyperspectral datacubes and 'live' interpretation of hyperspectral data. In addition, the structure of the model 600 (for example, the implementation of a DCP block) reduces a size of the model. That may enable the model 600 to be used across a range of platforms including embedded platforms and on mobile edge devices (for example, NVIDIA Jetson) whilst maintaining performance (e.g., 'live' viewing). Large high-wattage GPUs are not required for inference of the hyperspectral datacube using the model 600.

However, it will be appreciated that the combined reconstruction block 900 could also be used to reconstruct an enhanced hyperspectral datacube from a single sheared view of the scene. The single sheared view may be or comprise a direct measurement from a detector (for example, left-shear measurement 601). Alternatively, the single sheared view may be or comprise a single estimated hyperspectral datacube, for example a set of single shear features 850a, 850b output by one of the single shear reconstruction blocks 800a, 800b. The combined reconstruction block 900 may be used independently of the transformation blocks 700a, 700b, relative normalisation transforms and/or the single shear reconstruction blocks 800a, 800b.

The model 600 is also trained using a two-step approach. The first training step is responsible for training the transformation blocks 700a, 700b and the single shear reconstruction blocks 800a, 800b. The learning objective for that portion of the model 600 is to transform the sheared views (e.g., a left-shear measurement 601 and a right-shear measurement 603) by aligning the sheared views to the preview measurement 602 and to create a reconstructed data cube. The second training step is responsible for training the combined reconstruction block 900. The learning objective for that portion of the model 600 is to reconstruct a high quality hyperspectral datacube.

A two-step training approach may constrain learning of the model to two independent objectives. The two-step training approach comprises training each portion of the model 600 separately. Different loss functions may be used to independently control learning for each portion of the model 600. In turn, a single model can be trained to both transform sheared views and to reconstruct a hyperspectral datacube. By partitioning the problem in this way, a quality of the final hyperspectral datacube is improved. Training two portions of a single model also improves overall speed both in inference and in training. The model 600 can perform image alignment by correcting for view differences, and perform end-to-end reconstruction whilst maintaining real-time performance (for example, the ability to view reconstructed hyperspectral datacubes substantially in real-time, or 'live').

With regard to the first training step, the aim of the first training step is to train the first portion of the model 600 (the transformation blocks 700a, 700b and the single shear reconstruction blocks 800a, 800b) to enable substantially pixel-to-pixel mapping between the sheared views 601, 603 and the preview measurement 602, as well as to provide a single shear reconstruction attempt (an estimated hyperspectral datacube).

The first training step may be achieved by minimising the loss between the reconstruction attempt (the single shear features 850a, 850b), the objective hyperspectral datacube, and the preview measurement 602.

The objective hyperspectral datacube the shear measurements and the preview image may be determined using a synthetic dataset that simulates multiple views of a scene via a spectrally dispersive element and encoder. Parallax between the different views can be introduced. A synthetic dataset may be generated by assigning known spectra to different materials in a procedurally generated scene comprising three dimensional objections (e.g. a rendered/ray-traced synthetic view of a scene). Alternatively, real hyperspectral data may be used as the objective hyperspectral datacube, and the corresponding measurements at the various detectors simulated.

In an embodiment, the first training step may comprise using one or more of the following loss functions.

An L2 loss function may be used to train the first portion of the model 600. The L2 loss function represents a mean-squared-error (MSE) between the single shear features 850a, 850b (an estimated hyperspectral datacube) and the objective hyperspectral datacube. That loss function enforces the single shear reconstruction attempt to be representative of the objective hypercube.

An alignment loss function may additionally or alternatively be used to train the first portion of the model 600. The alignment loss function represents a mean error between a collapsed single shear reconstruction attempt (single shear features 850a, 850b) and the preview measurement 602. The collapsed single shear reconstruction attempt comprises a single value combination (for example, a sum, or an average) of the spectral layers of the hyperspectral datacube for each spatial point of the hyperspectral datacube. The alignment loss function enforces alignment between the reconstruction attempt and the preview measurement 602. The alignment loss function also reduces error in the energy distribution and/or concentration of the estimated hypercube. The alignment loss is specific to an approach in alignment of at least one sheared view is corrected to match a preview (unsheared) image.

A compressed measurement loss function represents a mean difference between an objective compressed measurement (obtained from simulation of measurement of an objective measured hyperspectral datacube, or simulated from a synthetic scene) and a compressed sheared measurement corresponding with the estimated hyperspectral datacube. The compressed sheared measurement corresponding with the estimated hyperspectral datacube can be determined by affine transforming the cube, masking, shearing and collapsing the wavelengths.

The compressed measurement loss function enforces realistic alignment and transformation (e.g., perspective transformation) between the preview measurement 602 and the sheared views. The compressed measurement loss is a loss function specific to hyperspectral imaging.

Training the first portion of the model 600 may comprise using a combination of loss functions, for example a weighted sum of two or more loss functions (or all the loss functions mentioned above).

With regard to the second training step, the aim of the second training step is to train the second portion of the model 600 (the combined reconstruction block 900) to combine the single shear reconstruction attempts 850a, 850b and enhance the result of the combination to produce a final reconstruction of a hyperspectral datacube.

The second training step may be achieved by matching the final reconstruction of the hyperspectral datacube and the objective hyperspectral datacube. In an embodiment, that may be achieved by using one or more of the following loss functions.

A Hierarchical Channel Reconstruction (HCR) loss function (see reference 1) enforces pixel-to-pixel similarity between the final reconstruction of the hyperspectral datacube and the objective hyperspectral datacube. The HCR loss function takes advantage of the HCR block in the combined reconstruction block 900.

A Structural Similarity Index Measure (SSIM) loss function (see reference 2) exploits the fact that adjacent hyperspectral channels share spatial features. The SSIM loss function can effectively verify that highly detailed features in distant (e.g. spatially/spectrally separated) portions of a hyperspectral datacube are consistent with each other.

A relative normalised loss function as defined below, standardises the spectral information present at each pixel location by normalising using the collapse of the collapse of the objective hyperspectral datacube. Relative normalised loss function utilities the training loop output 1708 of the relative normalisation transform 1700 described previous and shown in FIG. 12. as the final reconstruction of the model.

$$L = f(y, r) \qquad (3)$$

Where $$y_{i,j,k} = \frac{x_{i,j,k}}{\sum_{k=1}^{n} x_{i,j,k}} \qquad (4)$$

And, f represents the function to minimise, x represents an objective hyperspectral datacube and r represents the reconstruction result, with r being defined by equation 1.

The second portion of the model 600 may be trained using generative adversarial learning via a Generative Adversarial Network (GAN). A conditional GAN (cGAN) loss function may be used (see, for example, reference). A conditional GAN enables the discriminator to observe inputs from the generator. In this case, the generator of the GAN comprises the combined reconstruction block 900. The cGAN loss function may suppress reconstruction of unrealistic parallax-induced artefacts, and may further avoid blurriness in the output reconstruction. A GAN is preferable for training the second portion of the model 600, but is not essential.

A Spectral Information Divergence (SID) loss function allows for a more balanced penalisation for noise and flaws commonly associated with hyperspectral signals. Those flaws are typically not identified by spatial losses such as SSIM and MSE. The SID loss function calculates a distance between the probability distributions produced by the spectral signatures of two pixels.

The SID loss function is defined as:

$$SID(r_i, r_j) = D(r_i \vee r_j) + D(r_j \vee r_i) \qquad (1)$$

where $$D(r_j \vee r_i) = \sum_{l=1}^{L} q_l D_l(r_j \vee r_i) = \sum_{l=1}^{L} q_l(I_l(r_i) - I_l(r_j)) \qquad (2)$$

and $$D(r_j \vee r_i) = \sum_{l=1}^{L} p_l D_l(r_i \vee r_j) = \sum_{l=1}^{L} p_l(I_l(r_j) - I_l(r_i))()$$

where ‖ represents the relative entropy of $r_j$ to $r_i$, where p and q represent probability vectors $p=(p1, p2 \ldots pL)^T$ and $q=(q1, q2 \ldots qL)^T$, with $$p_k = \frac{s_{ik}}{\sum_{l=1}^{L} s_{il}} \text{ and } q_k = \frac{s_{jk}}{\sum_{l=1}^{L} s_{jl}},$$

and $I_i(r_j)=-\log q_l$ and $I_i(r_i)=-\log p_l$ are referred to as the 'self-information' of $r_j$ for band 1.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality and reference signs in the claims shall not be construed as limiting the scope of the claims.

REFERENCES

[1]. Miao, Xin, et al. "lambda-Net: Reconstruct Hyperspectral Images From a Snapshot Measurement." 2019 *IEEE CVF International Conference on Computer Vision (ICCV).* IEEE, 2019.

[2] Zhang, Han, et al. "Self-attention generative adversarial networks." *International Conference on Machine Learning.* PMLR, 2019.

[3] Isola, Phillip, et al. "Image-to-image translation with conditional adversarial networks." *Proceedings of the IEEE conference on computer vision and pattern recognition.* 2017.

The invention claimed is:

1. A method of reconstructing a hyperspectral data cube from at least one encoded and/or spectrally sheared image and an unencoded and spectrally unsheared image of a scene, the method comprising: providing the at least one encoded and/or spectrally sheared image and an unencoded and spectrally unsheared image to a neural network comprising an encoder-decoder structure having an encoder portion and a decoder portion; performing one or more primary convolution operations using the encoder portion; and performing one or more transpose convolution operations using the decoder portion; performing spatially adaptive normalization and/or inverted attention normalization on an output of at least one of the one or more primary convolution operations and/or transpose convolution operations, wherein the spatially adaptive normalization and/or inverted attention normalization is performed using a representation of an encoding scheme used to encode the at least one encoded and/or spectrally sheared image and an unencoded and spectrally unsheared image of the scene.

2. The method of claim 1, wherein performing spatially adaptive normalization comprises:

performing a first secondary convolution operation on a representation of a mask or unencoded and spectrally unsheared image of the scene;

performing a second secondary convolution operation on an output of the first secondary convolution operation;

performing element-wise multiplication between an output of the second secondary convolution operation and an output of a primary convolution operation or transpose convolution operation; and summing an output of the second secondary convolution operation with an output of the element-wise multiplication.

3. The method of claim 1, wherein performing inverted attention normalization comprises a convolution or transpose convolution operation applied on to input features, and/or one or more convolutional operations successively applied to results of the spatially adaptive normalization.

4. The method of claim 2, wherein performing inverted attention normalization comprises performing one of a sigmoid operation and/or softmax activation operation applied to the output of the primary convolutions or the secondary convolution operations previously applied, wherein the method comprises performing an element wise multiplication between an output of the primary convolutional operation and a result of the softmax activation operation, and one or more convolution and/or transposed convolution operations successively applied to the result of the element wise multiplication.

5. The method of claim 1, further comprising resizing a representation of a mask to match a resolution of the output of primary convolution operations or transpose convolution operations.

6. The method of claim 1, further comprising performing one or more residual convolution operations using one or both of the encoder portion and the decoder portion.

7. The method of claim 6, where performing a residual convolution operation comprises:

providing an input;

performing one or more successive convolution operations; and combining the input and an output of the series of successive convolution operations.

8. The method of claim 7, wherein combining the input and the output of the series of successive convolution operations comprises combining the input and the output of the series of successive convolution operations by either summation, concatenation or multiplication or a combination of these operations.

9. The method of claim 7, wherein the input is one of:

an output of a primary convolution operation or a transpose convolution operation;

an output of spatially adaptive normalization.

10. The method of claim 1, further comprising providing skip connections between the encoder portion and the decoder portion.

11. The method of claim 1, further comprising correcting the at least one encoded and/or spectrally sheared image for view differences comprising: using a machine learning algorithm which comprises a view correcting neural network, to determine a transform configured to map the first and second images to one another; and correcting for view differences by transforming one of the first image and the second image using the determined transform, wherein the method correcting for view differences comprises: concatenating the first image and the second image to form concatenated image data; providing the concatenated image data to the view correcting neural network; performing, using the view correcting neural network, one or more convolution operations; determining, using the view correcting neural network, the transform from an output of the one or more convolution operations; and transforming the one of the first image and the second image using the determined transform.

12. The method of claim 1, wherein the reconstructed cube comes from either an earlier layer of the network or an external source.

13. The method of claim 1, further comprising:

performing a plurality of convolution operations using the encoder portion; and performing a plurality of transpose convolution operations using the decoder portion.

14. The method of claim 1, further comprising performing a plurality of successive dilated convolution operations using the encoder portion, wherein a dilation rate increases with each successive dilated convolution operation with an increase rate greater than 0.

15. The method of claim 1, wherein a plurality of successive convolution operations are densely connected.

16. The method of claim 15, wherein an output of each preceding densely connected convolution operation is provided as an input to a subsequent densely connected convolution operation.

17. The method of claim 16, wherein the outputs of each preceding densely connected convolution operation are concatenated to provide the input to the subsequent densely connected convolution operation.

18. The method of claim 14, wherein the plurality of successive dilated convolution operations appears within the encoder portion.

19. The method of claim 1, wherein the decoder portion comprises a self-attention block configured to receive a final output of the encoder portion.

20. The method of claim 1, further comprising performing spatially adaptive normalization on an output of at least one of the primary convolution operations and/or transpose convolution operations using the unencoded and spectrally unsheared image of the scene.

21. The method of claim 1, further comprising reconstructing the hyperspectral datacube using hierarchical channel reconstruction.

22. The method of claim 1, further comprising providing more estimated hyperspectral datacubes to the neural network.

23. The method of claim 1, wherein an output of the neural network is transformed by a relative normalization operator to its collapse and a resulting representation is remapped using one or more spectrally sheared or unsheared views.

24. The method of claim 23, wherein the relative normalization operator comprises a sigmoid operation which is applied to a reconstructed hypercube, and a result of the sigmoid operation is divided by a reduced sum of itself along its final axis.

\* \* \* \* \*